(12) United States Patent
Hayashi et al.

(10) Patent No.: US 9,674,828 B2
(45) Date of Patent: Jun. 6, 2017

(54) TERMINAL APPARATUS

(71) Applicant: SHARP KABUSHIKI KAISHA, Osaka-shi, Osaka (JP)

(72) Inventors: Takashi Hayashi, Osaka (JP); Hiroki Takahashi, Osaka (JP); Jungo Goto, Osaka (JP); Osamu Nakamura, Osaka (JP); Kazunari Yokomakura, Osaka (JP); Yasuhiro Hamaguchi, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

(21) Appl. No.: 14/646,462

(22) PCT Filed: Nov. 1, 2013

(86) PCT No.: PCT/JP2013/079758
§ 371 (c)(1),
(2) Date: May 21, 2015

(87) PCT Pub. No.: WO2014/080744
PCT Pub. Date: May 30, 2014

(65) Prior Publication Data
US 2015/0341910 A1 Nov. 26, 2015

(30) Foreign Application Priority Data
Nov. 22, 2012 (JP) ................. 2012-256727

(51) Int. Cl.
H04W 72/00 (2009.01)
H04W 72/04 (2009.01)
(Continued)

(52) U.S. Cl.
CPC ......... *H04W 72/042* (2013.01); *H04L 5/0023* (2013.01); *H04W 16/32* (2013.01);
(Continued)

(58) Field of Classification Search
USPC ...................................... 455/452.1
See application file for complete search history.

(56) References Cited

U.S. PATENT DOCUMENTS 8,687,735 B2 4/2014 Takahashi et al.
8,880,109 B2 11/2014 Nakamura et al.
(Continued)

FOREIGN PATENT DOCUMENTS

EP 2317676 A1 5/2011
EP 2560428 A1 2/2013
(Continued)

OTHER PUBLICATIONS

NTT DOCOMO, "Enhanced Cell Identification for Additional Carrier Type", 3GPP TSG RAN WG1 Meeting #68, R1-120398, Dresden, Germany, Feb. 6-10, 2012.
(Continued)

Primary Examiner — Joel Ajayi
(74) Attorney, Agent, or Firm — Birch, Stewart, Kolasch & Birch, LLP

(57) ABSTRACT

A terminal apparatus, which performs communication with a first base station apparatus and a second base station apparatus which has a smaller maximum transmit power than that of the first base station apparatus, includes a control unit that extracts control information from signals received from the first base station apparatus and the second base station apparatus and sets communication parameters of an uplink data signal, in which a bit number of information which is extracted by the control unit as the control information from the signal from the second base station apparatus is smaller than a bit number of information which is extracted as the control information from the signal from the first base station apparatus.

4 Claims, 15 Drawing Sheets

(51) Int. Cl.
   *H04W 52/14* (2009.01)
   *H04L 5/00* (2006.01)
   *H04W 16/32* (2009.01)
   *H04W 52/40* (2009.01)
   *H04W 52/58* (2009.01)
   *H04W 88/02* (2009.01)
   *H04W 28/18* (2009.01)
   *H04W 52/36* (2009.01)

(52) U.S. Cl.
   CPC ......... *H04W 52/146* (2013.01); *H04W 52/40* (2013.01); *H04W 52/58* (2013.01); *H04W 28/18* (2013.01); *H04W 52/367* (2013.01); *H04W 88/02* (2013.01)

(56) References Cited

U.S. PATENT DOCUMENTS

| | | |
|---|---|---|
| 8,995,386 B2 | 3/2015 | Goto et al. |
| 8,996,010 B2 | 3/2015 | Hosono et al. |
| 9,253,735 B2 | 2/2016 | Coan et al. |
| 2011/0116566 A1 | 5/2011 | Takahashi et al. |
| 2012/0327866 A1* | 12/2012 | Krishnamurthy ..... H04W 52/10 370/329 |
| 2013/0083767 A1 | 4/2013 | Goto et al. |
| 2013/0143567 A1 | 6/2013 | Hosono et al. |
| 2013/0210445 A1 | 8/2013 | Nakamura et al. |
| 2014/0092838 A1 | 4/2014 | Coan et al. |
| 2015/0043546 A1 | 2/2015 | Nakamura et al. |

FOREIGN PATENT DOCUMENTS

| | | |
|---|---|---|
| JP | 2011-223057 A | 11/2011 |
| JP | 2011-259043 A | 12/2011 |
| JP | 2012-004829 A | 1/2012 |
| WO | WO 2014/055684 A | 4/2014 |

OTHER PUBLICATIONS

Extended European Search Report, dated Jun. 3, 2016, for European Application No. 13856683.1.

Panasonic, "Additional system performance evaluation for UL non-contiguous resource allocation," 3GPP TSG-RAN WG1 Meeting #61, R1-102865, Montreal, Canada, May 10-14, 2010, pp. 1/9-9/9.

* cited by examiner

FIG. 5

| CLUSTER Cl1 | | CLUSTER Cl2 | | CLUSTER Cl3 | |
|---|---|---|---|---|---|
| RB NUMBER | NUMBER OF RBs | RB NUMBER | NUMBER OF RBs | RB NUMBER | NUMBER OF RBs |
| 0 | 3 | 5 | 2 | 8 | 2 |

FIG. 6

| CLUSTER Cl1 | | CLUSTER Cl2 | |
|---|---|---|---|
| RB NUMBER | NUMBER OF RBs | RB NUMBER | NUMBER OF RBs |
| 13 | 12 | 29 | 6 |

FIG. 7

| INDEX | TIME INTERVAL | FREQUENCY INTERVAL |
|---|---|---|
| 0 | T0 | F0 |
| 1 | T1 | F0 |
| 2 | T2 | F1 |
| 3 | T3 | F1 |
| 4 | T4 | F2 |
| 5 | T5 | F2 |
| 6 | T6 | F3 |
| 7 | T6 | F3 |

FIG. 8

| INDEX | TIME INTERVAL | FREQUENCY INTERVAL |
|---|---|---|
| 0 | — | — |
| 1 | — | — |
| 2 | — | — |
| 3 | — | — |
| 4 | T4 | F2 |
| 5 | T5 | F2 |
| 6 | T6 | F3 |
| 7 | T6 | F3 |

| INDEX | TIME INTERVAL | FREQUENCY INTERVAL |
|---|---|---|
| 0 | — | — |
| 1 | T1 | F0 |
| 2 | — | — |
| 3 | T3 | F1 |
| 4 | — | — |
| 5 | T5 | F2 |
| 6 | — | — |
| 7 | T6 | F3 |

FIG. 13

| SYSTEM BANDWIDTH | NUMBER OF RESOURCE BLOCKS OF RESOURCE BLOCK GROUP |
|---|---|
| 5 MHz | 2 |
| 10 MHz | 3 |
| 15 MHz | 4 |
| 20 MHz | 5 |

FIG. 14

| SYSTEM BANDWIDTH | NUMBER OF RESOURCE BLOCKS OF RESOURCE BLOCK GROUP |
|---|---|
| 5 MHz | 4 |
| 10 MHz | 6 |
| 15 MHz | 8 |
| 20 MHz | 10 |

FIG. 16

| MCS | MODULATION SCHEME CODING RATE |
|---|---|
| 000 | BPSK: R=1/3 |
| 001 | BPSK: R=1/2 |
| 010 | QPSK: R=1/3 |
| 011 | QPSK: R=1/2 |
| 100 | 16QAM: R=1/3 |
| 101 | 16QAM: R=1/2 |
| 110 | 64QAM: R=1/3 |
| 111 | 64QAM: R=1/2 |

FIG. 17

| MCS | MODULATION SCHEME CODING RATE |
|---|---|
| 000 | Not Used |
| 001 | Not Used |
| 010 | Not Used |
| 011 | Not Used |
| 100 | 16QAM: R=1/3 |
| 101 | 16QAM: R=1/2 |
| 110 | 64QAM: R=1/3 |
| 111 | 64QAM: R=1/2 |

FIG. 18

| MCS | MODULATION SCHEME CODING RATE |
|---|---|
| 000 | 256QAM: R=1/3 |
| 001 | 256QAM: R=1/2 |
| 010 | QPSK: R=1/3 |
| 011 | QPSK: R=1/2 |
| 100 | 16QAM: R=1/3 |
| 101 | 16QAM: R=1/2 |
| 110 | 64QAM: R=1/3 |
| 111 | 64QAM: R=1/2 |

FIG. 20

| INDEX | NUMBER OF STREAMS | PRECODING PATTERN |
|---|---|---|
| 0 | 1 | PATTERN 0 |
| 1 | 1 | PATTERN 1 |
| ... | ... | ... |
| 23 | 1 | PATTERN 23 |
| 24 | 2 | PATTERN 0 |
| 25 | 2 | PATTERN 1 |
| ... | ... | ... |
| 39 | 2 | PATTERN 15 |

FIG. 21

| INDEX | NUMBER OF STREAMS | PRECODING PATTERN |
|---|---|---|
| 0 | Not Used | Not Used |
| 1 | Not Used | Not Used |
| ... | ... | ... |
| 23 | Not Used | Not Used |
| 24 | 2 | PATTERN 0 |
| 25 | 2 | PATTERN 1 |
| ... | ... | ... |
| 39 | 2 | PATTERN 15 |

TERMINAL APPARATUS

TECHNICAL FIELD

The present invention relates to a terminal apparatus.

This application claims priority based on Japanese Patent Application No. 2012-256727 filed in Japan on Nov. 22, 2012, the content of which is incorporated herein.

BACKGROUND ART

These days, in a mobile communication system, a band of a transmission band is being widened as demands for large capacity communication are increased, and a shortage of an available radio frequency resource becomes a problem accordingly. In order to improve frequency use efficiency with a limited radio frequency resource, increasing communication capacity by an MIMO (Multiple-Input Multiple-Output) transmission technology is regarded as being effective, but there is a limit on increase in the number of antennas due to a problem of an apparatus scale.

Thus, for example, it has been considered in NPL 1 etc., that in addition to a conventional cellular system in which a cell is formed so that each of macro base stations with the same scale covers different communication areas, by newly arranging a pico base station having a communication area smaller than that of the macro base station in a cell to form a new cell, it is sought to subdivide a' communication area per base station to increase communication capacity (hereinafter, a cell formed by the macro base station is referred to as a macro cell, and a cell formed by the pico base station is referred to as a small cell). As one example, in a case where a lot of terminal apparatuses exist in a macro cell in which a small cell is formed, the macro base station instructs a terminal apparatus which is positioned in the small cell to connect with the pico base station. By connecting the terminal apparatus which has received the instruction with the pico base station, a load imposed on the macro base station is able to be offloaded to the pico base station, resulting that transmission opportunities of all terminal apparatuses in the macro cell are able to be increased.

In the cellular system, typically, capability of a power amplifier is limited in a terminal apparatus which is desired to be downsized. Therefore, in uplink, a transmission scheme of a transmit signal is desired to have a PAPR (Peak to Average Power Ratio) as low as possible in order to seek linear amplification with high efficiency. In the LTE-A (Long Term Evolution-Advanced) standard which is actually specified these days, DFT-S-OFDM (Discrete Fourier Transform Spread Orthogonal Frequency Division Multiplexing; also referred to as SC-FDMA (Single Carrier Frequency Division Multiple Access)) and Clustered DFT-S-OFDM based on single carrier transmission having excellent PAPR performances are employed as the transmission scheme of the uplink.

CITATION LIST

Non Patent Literature

NPL 1: NTT DOCOMO, "Enhanced Cell Identification for Additional Carrier Type", 3GPP, 3GPP TSG RAN WG1 Meeting #68 R1-120398

SUMMARY OF INVENTION

Technical Problem

In the small cell, however, the terminal apparatus has remaining transmit power because the cell is small, and there is a problem that excellent transmission efficiency is not able to be achieved if the terminal apparatus is controlled in the same manner as the macro cell.

The present invention has been made in view of such circumstances, and an object thereof is to provide a terminal apparatus which achieves excellent transmission efficiency in a mobile communication system in which a small cell is arranged in a macro cell.

Solution to Problem (1) This invention has been made for solving the aforementioned problems, and an aspect of the present invention is a terminal apparatus capable of transmitting a signal to a first communication apparatus and a second communication apparatus, including: a reception unit that receives information associated with the first communication apparatus or the second communication apparatus from the first communication apparatus; a control unit that switches a maximum number of clusters used for transmission of the signal based on the information; and a transmission unit that transmits the signal by using the maximum number of clusters, which is switched by the control unit, in which the control unit uses different maximum numbers of clusters between a case where the signal is transmitted to the first communication apparatus based on the information and a case where the signal is transmitted to the second communication apparatus based on the information.

(2) Moreover, another aspect of the present invention is a first communication apparatus capable of transmitting a signal to a terminal apparatus, including a transmission unit that transmits, to the terminal apparatus, information used for determining to which of the first communication apparatus and a second communication apparatus that is different from the first communication apparatus the signal is to be transmitted by the terminal apparatus.

(3) Moreover, another aspect of the present invention is a communication method in a terminal apparatus capable of transmitting a signal to a first communication apparatus and a second communication apparatus, including: a first step of receiving information associated with the first communication apparatus or the second communication apparatus from the first communication apparatus; a second step of switching a maximum number of clusters used for transmission of the signal based on the information; and a third step of transmitting the signal by using the maximum number of clusters, which is switched in the second step, in which the second step uses different maximum numbers of clusters between a case where the signal is transmitted to the first communication apparatus based on the information and a case where the signal is transmitted to the second communication apparatus based on the information.

(4) Moreover, another aspect of the present invention is a communication method in a first communication apparatus capable of transmitting a signal to a terminal apparatus, including a step of transmitting, to the terminal apparatus, information used for determining to which of the first communication apparatus and a second communication apparatus that is different from the first communication apparatus the signal is to be transmitted by the terminal apparatus.

Advantageous Effects of Invention

According to aspects of this invention, excellent transmission efficiency is achieved in a mobile communication system in which a small cell is arranged in a macro cell.

BRIEF DESCRIPTION OF DRAWINGS

FIG. 5 is a view showing an example of assignment information which is generated by a macro base station apparatus 30a according to the same embodiment;

FIG. 6 is a view showing an example of assignment information which is generated by a pico base station apparatus 30b according to the same embodiment;

FIG. 7 is a view showing association of a time interval and a frequency interval which are stored in an interval storage unit for macro 236 with an index according to the same embodiment;

FIG. 8 is a view showing association of a time interval and a frequency interval which are stored in an interval storage unit for pico 237 with an index according to the same embodiment;

FIG. 13 is a view showing an example of a storage content of an RBG size storage unit for macro 240a according to the same embodiment;

FIG. 14 is a view showing an example of a storage content of an RBG size storage unit for pico 240b according to the same embodiment;

FIG. 16 is a view showing an example of a storage content of an MCS storage unit for macro 241a according to the same embodiment;

FIG. 17 is a view showing an example of a storage content of an MCS storage unit for pico 241b according to the same embodiment;

FIG. 18 is a view showing another example of a storage content of the MCS storage unit for pico 241b according to the same embodiment;

FIG. 20 is a view showing an example of a storage content of a pattern storage unit for macro 242a according to the same embodiment; and FIG. 21 is a view showing an example of a storage content of a pattern storage unit for pico 242b according to the same embodiment.

DESCRIPTION OF EMBODIMENTS

Description will hereinafter be given for embodiments of the present invention with reference to drawings. Description will be given in each embodiment below on the premise of uplink in a cellular system, but the same invention is applicable also to downlink. Note that, in a case of applying to the downlink, such a method for using an access scheme having excellent transmission performances in a base station having large transmit power (for example, a macro base station) and using an access scheme having good power efficiency in a base station having small transmit power (for example, a power-saving base station including a pico base station and a femto base station) is also considered, so that the downlink is also included in the present invention. Further, description will be given for the access scheme on the premise of DFT-S-OFDM (SC-FDMA) and Clustered DFT-S-OFDM which are access schemes of a single carrier base, but it is effective for other schemes which use a plurality of subcarriers including simple OFDM.

Moreover, a terminal apparatus discriminates the macro base station and the pico base station according to a measure of maximum transmit power of the downlink in each embodiment. From each of the base stations, information associated with maximum transmit power of the base stations may be notified to the terminal apparatus in the downlink, or from the macro base station, information associated with maximum transmit power of its own station and the pico base station may be notified to the terminal apparatus. Other identification methods are of course not excluded from the present invention.

[First embodiment]

Figure 1:
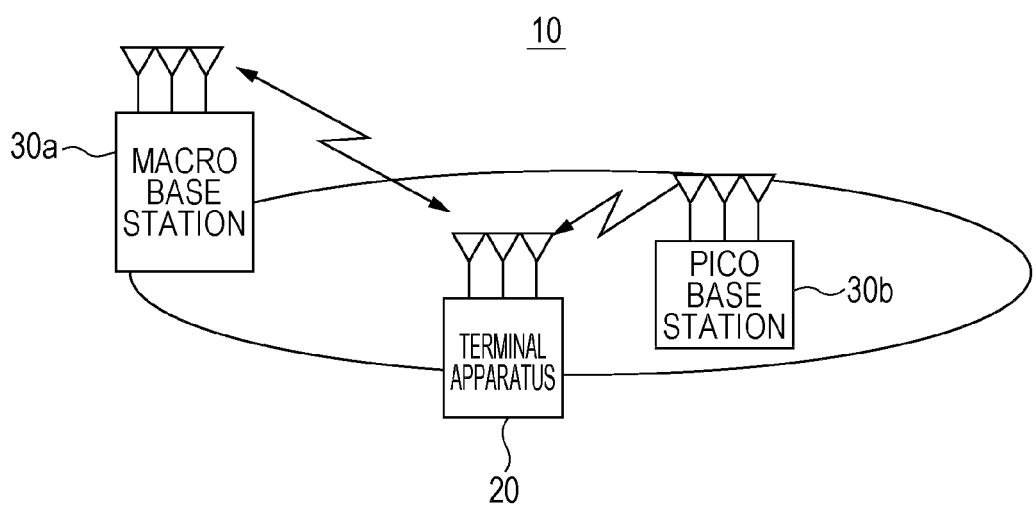
FIG. 1 is a conceptual diagram showing a configuration of a radio communication system according to a first embodiment of the present invention.

FIG. 1 is a conceptual diagram showing a configuration of a radio communication system according to a first embodiment of the present invention. A radio communication system 10 according to the present embodiment is configured by including a macro base station apparatus 30a, a pico base station apparatus 30b, and a terminal apparatus 20. However, the numbers of the respective base station apparatuses and the terminal apparatuses are one example, and any of them may be included in a plurality of pieces or each of them may be included in a plurality of pieces. The macro base station apparatus 30a is a base station apparatus which performs radio communication with the terminal apparatus 20. The pico base station apparatus 30b is also a base station apparatus which performs radio communication with the terminal apparatus 20, but, if being compared to the macro base station apparatus 30a, is different in terms of having smaller maximum transmit power and a narrower communication range.

Figure 2:
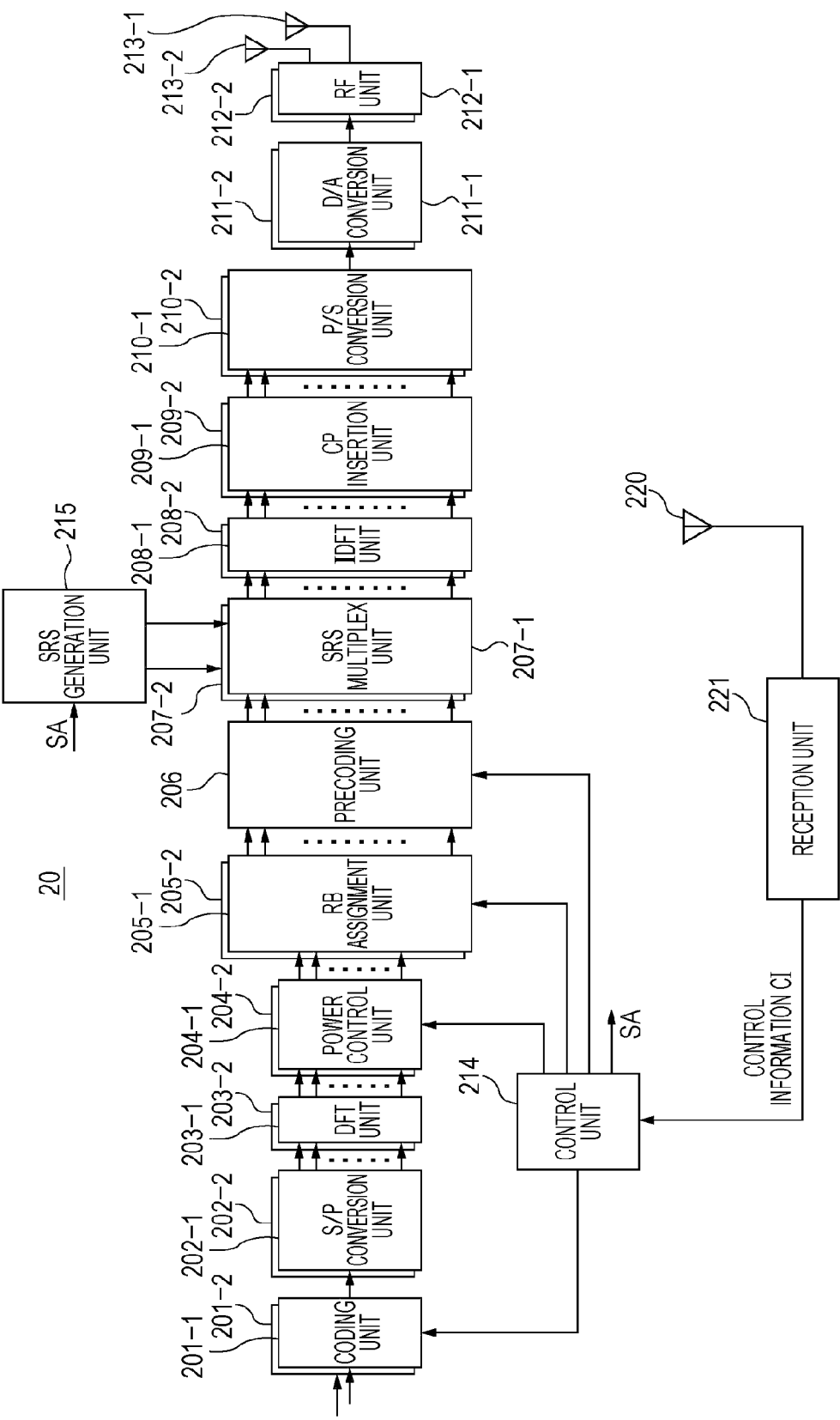
FIG. 2 is a schematic block diagram showing a configuration of a terminal apparatus 20 according to the same embodiment.

FIG. 2 is a schematic block diagram showing a configuration of the terminal apparatus 20 according to the present embodiment. In the present embodiment, description will be given by taking a configuration of a case where the maximum number of transmission streams that is usable by the terminal apparatus is two, as an example. Note that, a number of a part to which a number is assigned with hyphen in FIG. 2 (part assigned with hyphen 2 in FIG. 2) is determined by the maximum number of transmission streams that is usable by the terminal apparatus. The terminal apparatus 20 is configured by including coding units 201-1 and 201-2, S/P (Serial/Parallel) conversion units 202-1 and 202-2, DFT (Discrete Fourier Transform) units 203-1 and 203-2, power control units 204-1 and 204-2, RB assignment units 205-1 and 205-2, a precoating unit 206, SRS multiplex units 207-1 and 207-2, IDFT (Inverse Discrete Fourier Transform) units 208-1 and 208-2, CP (Cyclic Prefix) insertion units 209-1 and 209-2, P/S (Parallel/Serial) conversion units 210-1 and 210-2, D/A (Digital/Analog) conversion units 211-1 and 211-2, RF (Radio Frequency) units 212-1 and 212-2, transmit antenna units 213-1 and 213-2, a control unit 214, an SRS generation unit 215, a receive antenna unit 220 and a reception unit 221.

The coding unit 201-1 performs error correction coding of a bit sequence of a first stream, and then performs modulation such as BPSK (Binary Phase Shift Keying), QPSK (Quaternary Phase Shift Keying), or 16QAM (16-ary guadrature amplitude modulation) to generate a symbol string. The coding unit 201-2 performs same processing for a bit sequence of a second stream. Note that, both the coding units 201-1 and 201-2 follow designation from the control unit 214 as to a coding rate at the time of the error correction coding and the modulation scheme at the time of the modulation.

The S/P conversion unit 202-1 performs serial/parallel conversion for the symbol string generated by the coding unit 201-1. Note that, a parallel number of a serial/parallel conversion result is matched with a DFT point number in the DFT unit 203-1. The S/P conversion unit 202-2 performs same processing for a symbol string generated by the coding unit 201-2.

The DFT unit 203-1 performs discrete Fourier transform for the conversion result by the S/P conversion unit 202-1 to generate a discrete spectrum. The DFT unit 203-2 performs same processing for a conversion result by the S/P conversion unit 202-2. The power control unit 204-1 multiplies the discrete spectrum generated by the DFT unit 203-1 by a coefficient designated from the control unit 214. The power control unit 204-2 multiplies a discrete spectrum generated by the DFT unit 203-2 by a coefficient designated from the control unit 214.

The RB assignment unit 205-1 arranges the discrete spectrum which is multiplied by the coefficient at the power control unit 204-1 in a resource block designated from the control unit 214 and generates a frequency signal of the first stream. The RB assignment unit 205-2 performs same processing for the discrete spectrum which is multiplied by the coefficient at the power control unit 204-2 and generates a frequency signal of the second stream. Note that, here, the resource block is configured by one or more contiguous subcarriers and a continuous time width for a one symbol time or more, and is a minimum assignment unit in the event that the macro base station apparatus 30a and the pico base station apparatus 30b assign a radio resource to the terminal apparatus 20.

The precoding unit 206 multiplies a precoding matrix designated from the control unit 214 by vector composed of the frequency signal of the first stream and the frequency signal of the second stream and calculates the frequency signal for each of the transmit antenna units 213-1 and 213-2. Note that, in the case where the number of streams is one, the precoding matrix designated from the control unit 214 is multiplied by the frequency signal of the first stream and the frequency signal for each of the transmit antenna units 213-1 and 213-2 is calculated.

The SRS multiplex unit 207-1 multiplexes the frequency signal for the transmit antenna unit 213-1, which is generated by the precoding unit 206, with a sounding reference signal. The SRS multiplex unit 207-2 multiplexes the frequency signal for the transmit antenna unit 213-2 with the sounding reference signal in the same manner. The IDFT unit 208-1 performs inverse Fourier transform for the frequency signal which is multiplexed with the sounding reference signal by the SRS multiplex unit 207-1 and generates a time signal for the transmit antenna unit 213-1. The IDFT unit 208-2 performs the same for the frequency signal which is multiplexed with the sounding reference signal by the SRS multiplex unit 207-2 and generates a time signal for the transmit antenna unit 213-2. Note that, a DFT point number in the event of performing the inverse Fourier transform is a point number according to a system bandwidth. Moreover, the sounding reference signal is a signal for grasping a state of a channel. The state of the channel, which is grasped with the signal, is used in the event of determining the radio resource to be assigned to the terminal apparatus 20, etc.

The CP insertion unit 209-1 inserts a cyclic prefix to the time signal generated by the IDFT unit 208-1. Specifically, a signal of a predetermined point number from an end of a symbol zone in the time signal generated by the IDFT unit 208-1 is copied to be inserted at a head of the symbol zone. Accordingly, the parallel number of the time signal input to the CP insertion unit 209-1 is the point number according to the system bandwidth, while the parallel number of the signal in which the cyclic prefix is inserted by the CP insertion unit 209-1 is a number obtained by adding the point number for copying to the point number according to the system bandwidth. The CP insertion unit 209-2 performs processing in the same manner for the time signal generated by the IDFT unit 208-2.

The P/S conversion unit 210-1 performs parallel/serial conversion for the signal in which the cyclic prefix is inserted by the CP insertion unit 209-1 to generate a serial signal. The P/S conversion unit 210-2 performs same processing for the signal in which the cyclic prefix is inserted by the CP insertion unit 209-2. The D/A conversion unit 211-1 performs digital/analog conversion of the serial signal generated by the P/S conversion unit 210-1 to generate an analog signal. The D/A conversion unit 211-2 performs same processing for a serial signal generated by the P/S conversion unit 210-2.

The RF unit 212-1 up-converts the analog signal generated by the D/A conversion unit 211-1 to a radio frequency, which is subjected to radio transmission from the transmit antenna unit 213-1. The RF unit 212-2 up-converts the analog signal generated by the D/A conversion unit 211-2 to a radio frequency, which is subjected to radio transmission from the transmit antenna unit 213-2.

The receive antenna unit 220 receives signals transmitted by the macro base station apparatus 30a and the pico base station apparatus 30b. The reception unit 221 detects control information CI from the signals received by the receive antenna unit 220 to input to the control unit 214. This control information CI includes power control information associated with transmit power control, resource block assignment information, MCS (Modulation and Coding Scheme) information for designating a coding rate and a modulation scheme, rank information for designating the number of streams, precoding information for designating a precoding matrix, and SRS information for designating arrangement of the sounding reference signal.

The control unit 214 designates the coding rate and the modulation scheme to the coding units 201-1 and 201-2 based on the control information CI input from the reception unit 221. In the same manner, the control unit 214 designates the coefficient to be multiplied by the frequency signal for controlling power to the power control units 205-1 and 205-2. Further, the control unit 214 designates the resource block in which the signal is arranged to the RB assignment units 205-1 and 205-2 based on the input control information CI. Note that, in the present embodiment, the macro base station apparatus 30a and the pico base station apparatus 30b have different formats of the assignment information which is included in the control information CI and is for designating assignment of the resource block.

Moreover, the control unit 214 designates the precoating matrix which is used to the precoating unit 206 based on the input control information CI. Further, the control unit 214 designates arrangement of the sounding reference signal SA to the SRS generation unit 215 based on the input control information CI. In addition, the control unit 214 judges the number of streams based on the input control information CI, and in the case where the number of streams is one, causes only a portion which performs processing associated with the first stream to operate, and does not cause a portion which performs processing associated with the second stream to operate. Moreover, in the case where the number of streams is two as a result of the judgment, both of the portion which performs processing associated with the first stream and the portion which performs processing associated with the second stream are caused to operate.

Note that, the portion which performs processing associated with the first stream includes the coding unit 201-1, the S/P conversion unit 202-1, the DFT unit 203-1, the power control unit 204-1 and the RB assignment unit 205-1. The portion which performs processing associated with the second stream includes the coding unit 201-2, the S/P conversion unit 202-2, the DFT unit 203-2, the power control unit 204-2 and the RB assignment unit 205-2.

Moreover, the SRS generation unit 215 generates the sounding reference signal to be transmitted from the transmit antenna unit 213-1 in accordance with the designation of the arrangement SA from the control unit 214 to input to the SRS multiplex unit 207-1. In the same manner, the SRS generation unit 215 generates the sounding reference signal to be transmitted from the transmit antenna unit 213-2 to input to the RS multiplex unit 207-2.

Figure 3:
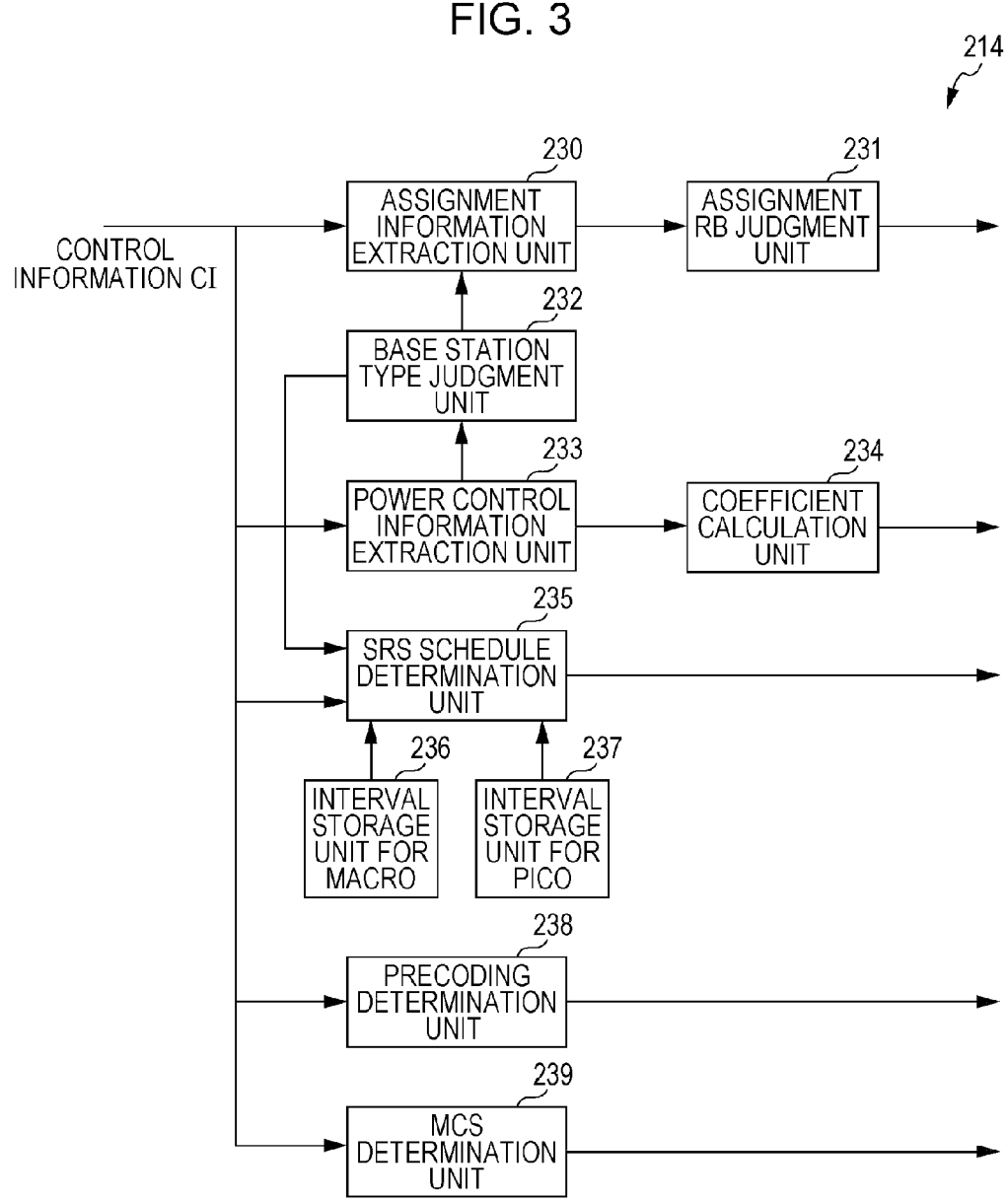
FIG. 3 is a schematic block diagram showing a configuration of a control unit 214 according to the same embodiment.

FIG. 3 is a schematic block diagram showing a configuration of the control unit 214. The control unit 214 is configured by including an assignment information extraction unit 230, an assignment RB judgment unit 231, a base station type judgment unit 232, a power control unit information extraction unit 233, a coefficient calculation unit 234, an SRS schedule determination unit 235, an interval storage unit for macro 236, an interval storage unit for pico 237, a precoding determination unit 238 and an MCS determination unit 239. The assignment information extraction unit 230 extracts assignment information from the control information CI input from the reception unit 221. The assignment information extraction unit 230 changes a format of the assignment information to be extracted according to a type of a destination base station acquired from the base station type judgment unit 232.

Note that, the format of the assignment information to be extracted in the case where the type of the destination base station is the pico base station is a format which has a smaller bit number than the format of the assignment information to be extracted in the case where the type of the destination base station is the macro base station. For example, in the case where the type of the destination base station acquired from the bases station type judgment unit 232 is the macro base station, the assignment information extraction unit 230 extracts the assignment information with a maximum value of the number of clusters of "3" from the control information CI. Further, in the case where the type of the destination base station acquired from the bases station type judgment unit 232 is the pico base station, the assignment information extraction unit 230 extracts the assignment information with the maximum value of the number of clusters of "2" from the control information CI. That is, the pico base station as the type of the destination base station has the smaller maximum value of the number of clusters than the macro base station and thus has the format with less bit number.

The assignment RB judgment unit 231 notifies the RB assignment units 205-1 and 205-2 of designation of the resource block in which the signal is arranged based on the assignment information extracted by the assignment information extraction unit 230. The base station type judgment unit 232 judges the type of the destination base station based on information associated with maximum transmit power of the destination base station, which is notified as the power control information, and notifies the assignment information extraction unit 230 and the SRS schedule determination unit 235 of a judgment result. Note that, the types of the base station includes the macro base station and the pico base station. The base station type judgment unit 232 judges as the macro base station if the maximum transmit power exceeds a predetermined threshold and judges as the pico base station if not exceeding. Note that, one notified by the destination base station as system information may be used as the information associated with the maximum transmit power. Moreover, the destination base station may notify information showing a type of its own station as the system information so that the base station type judgment unit 232 judges the type of the destination base station based on the information.

The power control information extraction unit 233 extracts power control information from the control information CI. The power control information extraction unit 233 notifies the base station type judgment unit 232 of information showing the maximum transmit power of the destination base station of the power control information. Further, the power control information extraction unit 233 notifies the coefficient calculation unit 234 of information for designating transmit power of the terminal apparatus 20 of the power control information. The coefficient calculation unit 234 calculates the coefficient to be multiplied by the frequency signal so as to provide designated transmit power. Note that, the information for designating the transmit power may be information for designating a difference from previous transmit power. In this case, the coefficient calculation unit 234 sets a value obtained by changing a previous coefficient based on the difference designated by the information as the coefficient to be multiplied by the frequency signal.

The SRS schedule determination unit 235 extracts SRS information from the control information CI, and determines arrangement of the sounding reference signal based on the SRS information. In the case where the type of the destination base station notified from the base station type judgment unit 232 is the macro base station, the SRS schedule determination unit 235 refers to the interval storage unit for macro 236 in the event of determining arrangement of the sounding reference signal. Moreover, in the case where the type of the destination base station notified from the base station type judgment unit 232 is the pico base station, the SRS schedule determination unit 235 refers to the interval storage unit for pico 237 in the event of determining arrangement of the sounding reference signal.

In the present embodiment, the SRS schedule determination unit 235 reads a time interval and a frequency interval according to an index indicated by the SRS information from the interval storage unit for macro 236 or the interval storage unit for pico 237, and determines arrangement of the sounding reference signal in accordance with the time interval and the frequency interval which are read. Here, the time interval is a cycle in which the sounding reference signal is arranged in an entire system band, and the frequency interval is a subcarrier interval at which the sounding reference signal is arranged.

Description will be given for the time interval and the frequency interval by taking a case where the system band has an RB number 0 to the RB number 127 as an example. In this case, for example, in the event that the sounding reference signal is arranged in resource blocks of the RB number 0 to the RB number 63 in a slot 0 (slot is a time zone which is defined by one or more continuous symbol time) and arranged in resource blocks of the RB number 64 to the RB number 127 in a slot 11, the sounding reference signal is to be arranged in the entire system band. Thereafter, in the event that the sounding reference signal is arranged in resource blocks from the RB number 0 to the RB number 63 again in a slot 50, time from the slot 0 to the slot 50 (50 slots) serves as the time interval. Moreover, in a case where at the time of arrangement the sounding reference signal for each resource block, the sounding reference signal is not arranged in all subcarriers but, for example, for every four subcarriers, these four subcarriers are the frequency time interval.

The interval storage unit for macro 236 stores the time interval and the frequency interval at which the sounding reference signal is arranged in association with the index. The interval storage unit for macro 236 is referred to in the case where the destination base station is the macro base station. The interval storage unit for pico 237 stores the time interval and the frequency interval at which the sounding reference signal is arranged in association with the index. The interval storage unit for pico 237 is referred to in the case where the destination base station is the pico base station. A minimum value of the time interval or the frequency interval stored in the interval storage unit for pico 237 is larger than a minimum value of the time interval or the frequency interval stored in the interval storage unit for macro 236.

Note that, the interval storage unit for macro 236 and the interval storage unit for pico 237 may store not the time interval and the frequency interval, but information representing arrangement of the sounding reference signal. In this case, the SRS schedule determination unit 235 uses arrangement of the sounding reference signal which is represented by information associated with the index indicated by the SRS information. Moreover, a minimum value of the time interval or the frequency interval of arrangement which is represented by the information stored in the interval storage unit for pico 237 is larger than a minimum value of the time interval or the frequency interval of arrangement which is represented by the information stored in the interval storage unit for macro 236.

The precoding determination unit 238 extracts an index indicating a combination of the number of streams and the precoding matrix from the control information CI. The precoding determination unit 238 determines the number of streams and the precoding matrix to be used based on the extracted index to notify the precoding unit 206. The MCS determination unit 239 extracts MCS information from the control information CI. The MCS determination unit 239 notifies the coding unit 201 of the modulation scheme and the coding rate which are indicated by the extracted MCS information.

Figure 4:
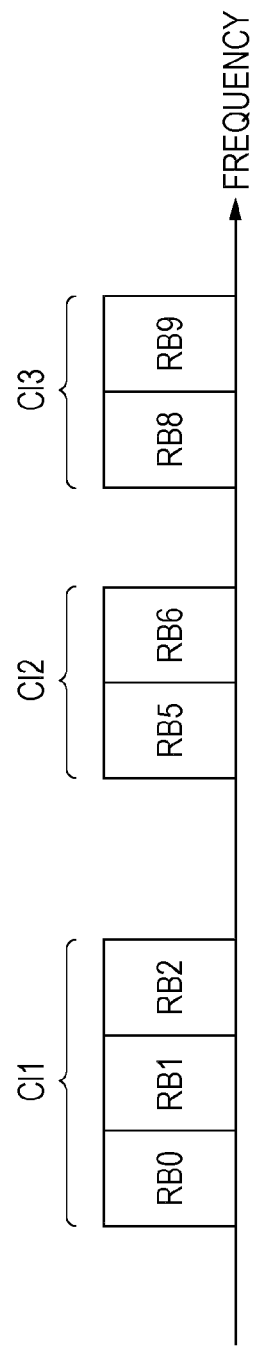
FIG. 4 is a conceptual diagram explaining Clustered DFT-S-OFDM which is a communication scheme used in the case of transmission by the terminal apparatus 20 according to the same embodiment.

FIG. 4 is a conceptual diagram explaining Clustered DFT-S-OFDM which is a communication scheme used in the case of transmission by the terminal apparatus 20. In FIG. 4, an horizontal axis is a frequency, and each frequency band assigned with reference numerals RB0, RB1, RB2, RB5, RB6, RB8 and RB9 is a resource block assigned to the terminal apparatus 20. While all contiguous frequency bands are assigned in the DFT-S-OFDM, some contiguous frequency bands are assigned discretely in the Clustered DFT-S-OFDM. Respective some contiguous frequency bands which are assigned discretely are referred to as a cluster. In FIG. 4, the resource blocks RB0, RB1 and RB2 are contiguous frequency bands and constitute a cluster C11. In the same manner, the resource blocks RB5 and RB6 are contiguous frequency bands and constitute a cluster C12. The resource blocks RB8 and RB9 are contiguous frequency bands and constitute a cluster C13. That is, the number of clusters is three in the example shown in FIG. 4. Note that, a maximum value of the number of clusters is also referred to as a maximum division number.

Note that, Compared to the DFT-S-OFDM, the Clustered DFT-S-OFDM is able to use discrete frequency resources, and thus has advantages that a frequency selection diversity gain by selection of resource blocks to be used is able to be expected and band use efficiency is improved by flexible selection of resource blocks, but has an disadvantage that PAPR (Peak to Average Power Ratio) performances are deteriorated by using the discrete resource blocks.

FIG. 5 is a view showing an example of assignment information which is generated by the macro base station apparatus 30a. In the example of the present embodiment, a format of assignment information generated by the macro base station apparatus 30a is a format having the maximum value of the number of clusters (maximum division number) of "3". The example of the assignment information shown in FIG. 5 is composed of the RB number "0" and the number of RBs "3" of the cluster C11, the RB number "5" and the number of RBs "2" of the cluster C12, and the RB number "8" and the number of RBs "2" of a cluster C13. That is, the format has each three (maximum value of the number of clusters) of regions in which the RB number is arranged and regions in which the number of RBs is arranged.

Here, the RB number is a serial number beginning from 0 which is assigned to each resource block in order from a smaller frequency. Further, the number of RBs is the number of contiguous resource blocks constituting the cluster. For example, in the assignment information shown in FIG. 5, since the RB number and the number of RBs of the cluster C13 are "8" and "2", the cluster C13 is composed of resource blocks having the RB numbers of "8" and "9".

FIG. 6 is a view showing an example of assignment information which is generated by the pico base station apparatus 30b. In the example of the present embodiment, a format of assignment information generated by the pico base station apparatus 30b is a format having the maximum value of the number of clusters of "2" which is a smaller value than the case of the macro base station apparatus 30a. The example of the assignment information shown in FIG. 5 is composed of the RB number "13 and the number of RBs "12" of a cluster C11, and the RB number "29" and the number of RBs "6" of a cluster C12. That is, the format has each two (maximum value of the number of clusters) of regions in which the RB number is arranged and regions in which the number of RBs is arranged.

Assuming that the assignment information of the macro base station apparatus 30a has the format as described above, a bit number which is necessary for designating the RB number is a, and a bit number which is necessary for designating the number of RBs is b, in a case where the maximum value of the number of clusters is N, the bit number of N (a+b) becomes necessary for the assignment information. On the other hand, in a case where the maximum value of the number of clusters in the assignment information of the pico base station apparatus 30b is N−c, the bit number which is necessary for the assignment information of the pico base station apparatus 30b is (N−c)× (a+b). That is, the assignment information of the pico base station apparatus 30b is able to achieve reduction of c (a+b) bits compared to the assignment information of the macro base station apparatus 30a. Note that, in the examples of FIG. 5 and FIG. 6, c is "1".

Note that, as the format of assignment information, other format may be used. For example, bit information showing a combination of the RB number of a head and the RB number of termination in each cluster may be used. In this case as well, by decreasing the maximum value of the number of clusters in the pico base station apparatus 30b, it is possible to reduce the requisite bit number. Moreover, the maximum value of the number of clusters in the pico base station apparatus 30b may be "1" and the terminal apparatus 20 may perform transmission to the pico base station apparatus 30b by using not the Clustered DFT-S-OFDM but the DFT-S-OFDM.

As described before, the advantage of the assignment by dividing into a plurality of clusters (assigning resource blocks discretely) is to acquire a diversity gain by selecting resource blocks with excellent channel performances. As the maximum value of the number of clusters increases, flexibility of the assignment of resource blocks is enhanced, so that it is possible to further improve the diversity gain by assigning resource blocks with more excellent channel performances. However, since the small cell which is a service area of the pico base station apparatus 30b has a narrow cell range, distance attenuation between the pico base station apparatus 30b and the terminal apparatus 20 is suppressed. Therefore, since there is a margin in transmit power of the terminal apparatus 20, even in the case where the diversity gain by selection is not so high as the case of the macro base station apparatus 30a, it is possible to acquire sufficient communication quality by increasing the transmit power. Further, the small cell has a narrow cell range and is therefore not susceptible to a delay wave compared to the macro cell, so that frequency selectivity of a channel is relatively weak. In such an environment, the frequency diversity gain by assigning resource blocks discretely is reduced.

As one of methods for increasing the transmit power of the terminal apparatus 20 in the case where communication of the pico base station apparatus 30b and the terminal apparatus 20 is performed, there is a method for setting target receive power of the pico base station apparatus 30b to target receive power of the macro base station apparatus 30a or more.

Description will be given for transmit power control of the terminal apparatus 20 in the case where the target receive power of the pico base station apparatus 30b is set to the target receive power of the macro base station apparatus 30a or more, by using a formula of transmit power control (TPC) which is used in uplink of LTE-A. Transmit power of PUSCH (which is Physical Uplink Shared Channel and is a so-called physical channel for transmitting data) $P_{PUSCH}(i)$ is given by a formula (1). The control unit 214 calculates the transmit power $P_{PUSCH}(i)$ by using the formula (1) and instructs the power control units 204-1 and 204-2 to use a coefficient according to the calculation result. Here, the formula (1) is for a case where only the PUSCH is transmitted with the macro base station apparatus 30a or the pico base station apparatus 30b as a reception station in the uplink.

$$P_{PUSCH}(i) = \min\{P_{CMAX}(i), 10\log_{10}(M_{PUSCH}(i)) + P_{0\_PUSCH}(j) + \alpha(j) \cdot PL + \Delta(i) + f(i)\} \quad (1)$$

A function min is a function which returns a minimum element in an argument. Here, $P_{CMAX}(i)$ is maximum transmit power which is able to be assigned by the terminal apparatus, i is a sub-frame number for transmitting the PUSCH of a control target, and $M_{PUSCH}(i)$ is the number of resource blocks of the PUSCH. Moreover, a value of j varies depending on a scheduling method of radio resources of the PUSCH used by the terminal apparatus, and it is set that j=0 in the case of using semi-persistent scheduling in which radio resources are assigned at a regular cycle, and j=1 in the case of using dynamic scheduling in which radio resources are assigned dynamically. Further, it is set that j=2 in the case of using for transmission of random access preamble (a signal which is transmitted to the reception station by the terminal apparatus 20 first in order to establish a connection state between the reception station and the terminal apparatus 20). $P_{0\_PUSCH}(j)$ is for prescribing target receive power of the reception station (minimum power demanded in the reception station), and is determined by a sum of $P_{0\_NOMINAL\_PUSCH}(j)$ and $P_{0\_UE\_PUSCH}(j)$ notified from the reception station.

In addition, $\alpha(j)$ is a value which is notified from the reception station to the terminal apparatus 20, and one is selected from {0, 0.4, 0.5, 0.6, 0.7, 0.8, 0.9, 1} when j=0 and j=1, and 1 is given when j=2. PL is a value of channel loss (path loss) (which is also referred to as coupling loss and may be loss in consideration of an antenna gain or the like) with decibel (dB) as a unit estimated by the terminal apparatus 20 by using a reference signal which is transmitted in the downlink, $\Delta(i)$ is a value determined by a modulation scheme or a coding scheme used by the terminal apparatus 20, and f(i) is a TPC command which is used for transmit power control by closed loop (a control value of transmit power transmitted from the reception station) and is notified from the reception station.

The formula (1) is for calculating transmit power for satisfying a fixed reception level at the reception station in the event that the terminal apparatus 20 transmits the PUSCH, meaning that in the case where this transmit power is smaller than the maximum transmit power $P_{CMAX}(i)$ of the PUSCH, which is allowed in the terminal apparatus, the transmission is performed by using this transmit power, and in the case of being larger than $P_{CMAX}(i)$, the transmission is performed with $P_{CMAX}(i)$ as transmit power.

As described above, as the number of clusters increases, flexibility of assignment of resource blocks is enhanced, so that it is possible to select resource blocks with excellent channel performances, and therefore the terminal apparatus 20 is able to achieve receive power desired by the reception station with small transmit power as the number of clusters increases.

Considered is a case where communication is performed with the macro base station apparatus 30a and the pico base station apparatus 30b which have the same target receive power with the same bandwidth, the same modulation scheme and the same coding rate respectively. Here, in the case where channel losses measured with a downlink reference signal are the same, the transmit power which is set by the formula (1) becomes the same in both cases of transmitting to the macro base station apparatus 30a and the pico base station apparatus 30b. However, since the communication with the macro base station apparatus 30a in which the number of clusters is large and more flexible assignment is possible achieves a higher frequency gain, power at the time of reception becomes higher than the pico base station apparatus 30b.

Therefore, even if the receive power from the terminal apparatus 20 in the macro base station apparatus 30a reaches desired target receive power of the macro base station apparatus 30a, the receive power from the terminal apparatus 20 in the pico base station apparatus 30b does not reach desired target receive power of the pico base station apparatus 30b in some cases, and in such a case, the pico base station apparatus 30b instructs the terminal apparatus 20 to increase the transmit power for lacking power by notifying a TPC command which is used for transmit power control by the closed loop in the formula (1) over a plurality of times.

Note that, by setting the target receive power of the pico base station apparatus 30b to be larger than the target receive power of the macro base station apparatus 30a (adding power for compensating for deterioration of communication quality because of not allowing flexible frequency selection to the target receive power of the pico base station apparatus 30b), the receive power desired by the pico base station apparatus 30b is also able to be achieved.

That is, in the case where the target receive power notified by the pico base station apparatus 30b to the terminal apparatus 20 is set to the target receive power notified by the macro base station apparatus 30a to the terminal apparatus 20 or more, the transmit power in the event that the terminal apparatus 20 performs communication with the pico base station apparatus 30b becomes larger than the transmit power in the event that the terminal apparatus 20 performs communication with the macro base station apparatus 30a. This leads to compensation for deterioration of communication quality because of not allowing flexible frequency selection by increasing the transmit power.

Note that, a method for setting the target receive power of the pico base station apparatus 30b to the target receive power of the macro base station apparatus 30a or more is one of methods for setting a coefficient which is designated to the power control unit 204-1 and the power control unit 204-2 from the control unit 214 so that "the transmit power in the case where the terminal apparatus 20 performs communication with the pico base station apparatus 30b>the transmit power in the case where the terminal apparatus 20 performs communication with the macro base station apparatus 30a, in a case where the channel loss between the terminal apparatus 20 and the macro base station apparatus 30a is the same as the channel loss between the terminal apparatus 20 and the pico base station apparatus 30b".

In the present invention, the method for setting the coefficient which is designated to the power control unit 204-1 and the power control unit 204-2 from the control unit 214 so that "the transmit power in the case where the terminal apparatus 20 performs communication with the pico base station apparatus 30b>the transmit power in the case where the terminal apparatus 20 performs communication with the macro base station apparatus 30a, in a case where the channel loss between the terminal apparatus 20 and the macro base station apparatus 30a is the same as the channel loss between the terminal apparatus 20 and the pico base station apparatus 30b" is not limited to one.

For example, the control unit 214 may set $\Delta(i)$ to a larger value in the case of transmission to the pico base station apparatus 30b than the case of transmission to the macro base station apparatus 30a even in the case where the modulation schemes and the coding schemes are the same.

Moreover, a range of the present invention is not departed also in the case where other methods are used, including, for example, transmit power control in which transmit power is calculated such that in a case where the terminal apparatus 20 receives a TPC command from the pico base station apparatus 30b, the terminal apparatus 20 translates a transmit power control value by the TPC command to a larger transmit power control value than a case where the TPC command is received from the macro base station apparatus 30a (an example of translation of the TPC command is shown: in the case where the transmit power control value by the TPC command "00" is −1 decibel, the transmit power control value by the TPC command "01" is 0 decibel, the transmit power control value by the TPC command "10" is 1 decibel and the transmit power control value by the TPC command "11" is 3 decibel, the terminal apparatus 20 translates the transmit power control value by the TPC command "00" to −1 decibel, the transmit power control value by the TPC command "01" to 0 decibel, the transmit power control value by the TPC command "10" to 3 decibel and the transmit power control value by the TPC command "11" to 6 decibel).

For these reasons, in connection of the pico base station apparatus 30b with the terminal apparatus 20, in the case where the maximum number of clusters is made smaller than the case of connection with the macro base station apparatus 30a and the bit number requisite for assignment information is reduced to thereby reduce overhead by control information, larger improvement effect of throughput is achieved than the effect by the frequency diversity gain.

That is, in the case where the maximum value of the number of clusters at the time of connection with the pico base station apparatus 30b is made smaller than the maximum value of the number of clusters at the time of connection with the macro base station apparatus 30a, it is possible to reduce an information quantity of the control information without occurrence of degradation of communication quality.

Note that, the terminal apparatus 20 may notify the macro base station apparatus 30a and the pico base station apparatus 30b of different values as to the maximum value of the number of clusters that is able to be transmitted by the terminal apparatus 20 so that the maximum value of the number of clusters becomes different between assignment information used by the macro base station apparatus 30a and assignment information used by the pico base station apparatus 30b. Moreover, each of the terminal apparatuses 20 may notify only the macro base station apparatus 30a of the maximum value of the number of clusters, and the macro base station apparatus 30a may notify the pico base station apparatus 30b by changing the maximum value notified from each of the terminal apparatuses 20 (by changing to the maximum value of the number of clusters that the pico base station is able to perform designation to the terminal apparatus 20).

In the case of the formats as shown in FIG. 5 and FIG. 6, the terminal apparatus 20 notifies only the macro base station apparatus 30a of the maximum value of the number of clusters, and if the macro base station apparatus 30a notifies the pico base station apparatus 30b by changing this maximum value, the terminal apparatus 20 notifies the macro base station apparatus 30a of the maximum value as 3 and the macro base station apparatus 30a notifies the pico base station apparatus 30b of the maximum value of this terminal apparatus 20 as 2. In any case, overhead associated with notification is increased compared to the case where communication only with the macro base station apparatus 30a is premised.

Moreover, the number of clusters in communication of the terminal apparatus 20 with the pico base station apparatus 30b may be set to be only a predetermined value. This makes is possible to reduce the overhead associated with notification described above. Note that, as shown before, since it is considered that there is a margin in transmit power in the communication of the terminal apparatus 20 with the pico base station apparatus 30b and there is less necessity for selecting resource blocks discretely, it is desired that the aforementioned predetermined value is set to 1 (division is not allowed) to reduce the overhead.

FIG. 7 is a view showing association of a time interval and a frequency interval which are stored in the interval storage unit for macro 236 with an index. In FIG. 7, the time interval "T0" and the frequency interval "F0" are associated with the index "0". In the same manner, the time interval "T1" and the frequency interval "F0" are associated with the index "1". The time interval "T2" and the frequency interval "F1" are associated with the index "2". The time interval "T3" and the frequency interval "F1" are associated with the index "3".

The time interval "T4" and the frequency interval "F2" are associated with the index "4". The time interval "T5" and the frequency interval "F2" are associated with the index "5". The time interval "T6" and the frequency interval "F3" are associated with the index "6". The time interval "T7" and the frequency interval "F3" are associated with the index "7". Note that, T0<T1<T2<T3<T4<T5<T6<T7. Further, F0<F1<F2<F3. Note that, the interval storage unit for macro 236 is also able to select the time interval and the frequency interval respectively from the different indexes. For example, it is also possible that "T5" which is associated with the index "5" is used as the time interval and "F3" which is associated with the index "7" is used as the frequency interval.

FIG. 8 is a view showing association of a time interval and a frequency interval which are stored in the interval storage unit for pico 237 with an index. In FIG. 8, the time interval and the frequency interval are not associated with the index "0" to the index "3". The time interval and the frequency interval are associated with the index "4" to the index "7" in the same manner as the interval storage unit for macro 236. That is, the time interval "T4" and the frequency interval "F2" are associated with the index "4".

The time interval "T5" and the frequency interval "F2" are associated with the index "5". The time interval "T6" and the frequency interval "F3" are associated with the index "6". The time interval "T7" and the frequency interval "F3" are associated with the index "7". That is, a minimum value of the time interval stored in the interval storage unit for pico 237 (T4) is a larger value than a minimum value of the time interval stored in the interval storage unit for macro 236 (T0). Further, a minimum value of the frequency interval stored in the interval storage unit for pico 237 (F2) is a larger value than a minimum value of the frequency interval stored in the interval storage unit for macro 236 (T0). Note that, the interval storage unit for pico 237 is also able to select the time interval and the frequency interval respectively from the different indexes. For example, it is also possible that "T5" which is associated with the index "5" is used as the time interval and "F3" which is associated with the index "7" is used as the frequency interval.

Figures 9, 10:
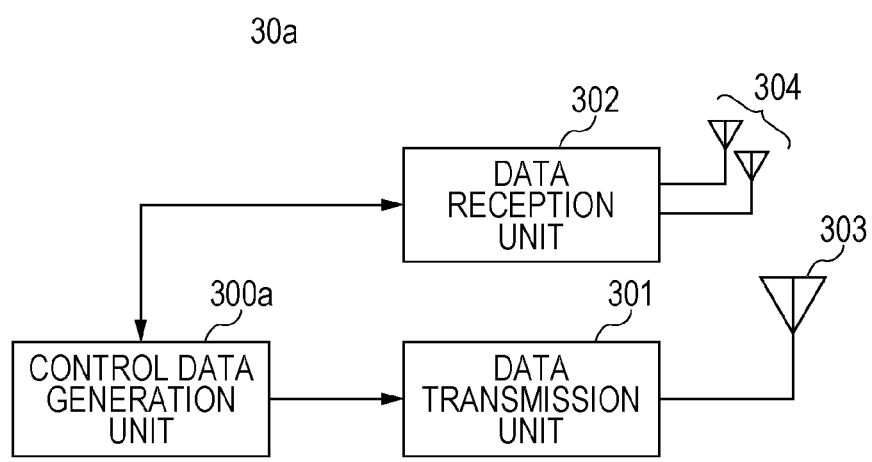
FIG. 9 is a view showing another example of association of a time interval and a frequency interval which are stored in the interval storage unit for pico 237 with an index according to the same embodiment.
FIG. 10 is a schematic block diagram showing a configuration of the macro base station apparatus 30a according to the same embodiment.

Moreover, the association of the time interval and the frequency interval which are stored in the interval storage unit for pico 237 with the index may be as shown in FIG. 9. In FIG. 9, the time interval and the frequency interval are not associated with the indexes "0", "2", "4" and "6". The time interval and the frequency interval are associated with the indexes "1", "3", "4" and "5" in the same manner as the interval storage unit for macro 236. That is, the time interval "T1" and the frequency interval "F0" are associated with the index "1". The time interval "T3" and the frequency interval "F1" are associated with the index "3". The time interval "T5" and the frequency interval "F2" are associated with the index "5". The time interval "T7" and the frequency interval "F3" are associated with the index "7". In the case of FIG. 9, a minimum value of the time interval stored in the interval storage unit for pico 237 (T1) is a larger value than a minimum value of the time interval stored in the interval storage unit for macro 236 (T0). However, both of them have the same minimum values of the frequency interval, "F0". Note that, the interval storage unit for pico 237 is also able to select the time interval and the frequency interval respectively from the different indexes. For example, it is also possible that "T5" which is associated with the index "5" is used as the time interval and "F3" which is associated with the index "7" is used as the frequency interval.

In this manner, the minimum value of the frequency interval stored in the interval storage unit for pico 237 is larger than the minimum value of the frequency interval stored in the interval storage unit for macro 236, or the minimum value of the time interval stored in the interval storage unit for pico 237 is larger than the minimum value of the time interval stored in the interval storage unit for macro 236. Therefore, an arrangement interval at which the sounding reference signal is arranged becomes wider in a case where the destination base station is the pico base station than a case where the destination base station is the macro base station. In the case where the destination base station is the pico base station, even if the arrangement interval of the sounding reference signal is made wider and scheduling is performed with accuracy of a channel estimation value lowered, there is a margin in transmit power of the terminal apparatus 20, thus making it possible to perform sufficiently excellent transmission by increasing the transmit power. In addition, since the arrangement interval of the sounding reference signal is made wider, it is possible to suppress overhead by the sounding reference signal and achieve excellent transmission efficiency.

FIG. 10 is a schematic block diagram showing a configuration of the macro base station apparatus 30a. The macro base station apparatus 30a is configured by including a control data generation unit 300a, a data transmission unit 301, a data reception unit 302, a transmit antenna 303, and a plurality of receive antennas 304. The control data generation unit 300a generates control information CI to be notified to the terminal apparatus 20 by referring to a channel estimation value which is input from the data reception unit 302. The control data generation unit 300a inputs the generated control information CI to the data transmission unit 301 to transmit to the terminal apparatus 20.

As described above, the control information CI includes power control information associated with transmit power control, resource block assignment information, MCS (Modulation and Coding Scheme) information for designating a coding rate and a modulation scheme, rank information for designating the number of streams, precoding information for designating a precoding matrix, and SRS information for designating arrangement of the sounding reference signal. Note that, as to the control data generation unit 300a, by taking a case where the maximum value of the number of clusters of the terminal apparatus 20 is "3" in the event of performing the scheduling for determining assignment of resource blocks in the uplink as an example, assignment information of the resource blocks in the uplink generated by the control data generation unit 300a is assignment information having the maximum value of the number of clusters of "3", which is exemplified in FIG. 5.

Moreover, the control data generation unit 300a has the interval storage unit for macro 236 shown in FIG. 3, and determines a combination which is used by each of the terminal apparatuses 20 connected with the own apparatus from combinations of the time interval and the frequency interval which are stored in the interval storage unit for macro 236. The control data generation unit 300a generates SRS information which includes an index of the determined combination. The control data generation unit 300a extracts a sounding reference signal generated in accordance with the SRS information by the terminal apparatus 20 from a reception signal, and estimates a channel by using the extracted signal. A result of this channel estimation is used for the scheduling described above.

Note that, the control data generation unit 300a inputs the resource block assignment information, the MCS information, the rank information and the precoding information of the generated control information CI to the data reception unit 302. Further, the control data generation unit 300a generates information showing arrangement of the sounding reference signal according to the SRS information of the generated control information CI to input to the data reception unit 302.

The data transmission unit 301 performs modulation, digital/analog conversion, up-converting or the like for the control information C1 input from the control data generation unit 300a for radio transmission to the terminal apparatus 20 by using the transmit antenna 303. The data reception unit 302 receives a signal transmitted by the terminal apparatus 20 by using the plurality of antennas 304, and performs down-converting, analog/digital conversion, stream separation, demodulation or the like. At this time, the data reception unit 302 refers to the resource block assignment information, the MCS information, the rank information and the precoding information which are input from the control data generation unit 300a. For example, the data reception unit 302 selects a modulation scheme in the event of performing demodulation by referring to the MCS information.

Moreover, the data reception unit 302 extracts the sounding reference signal which is included in the received signal in accordance with the information showing arrangement of the sounding reference signal, and estimates a channel between the terminal apparatus 20 and the receive antenna 304. The data reception unit 302 inputs a channel estimation value which is acquired by the estimation to the control data generation unit 300a.

Figure 11:
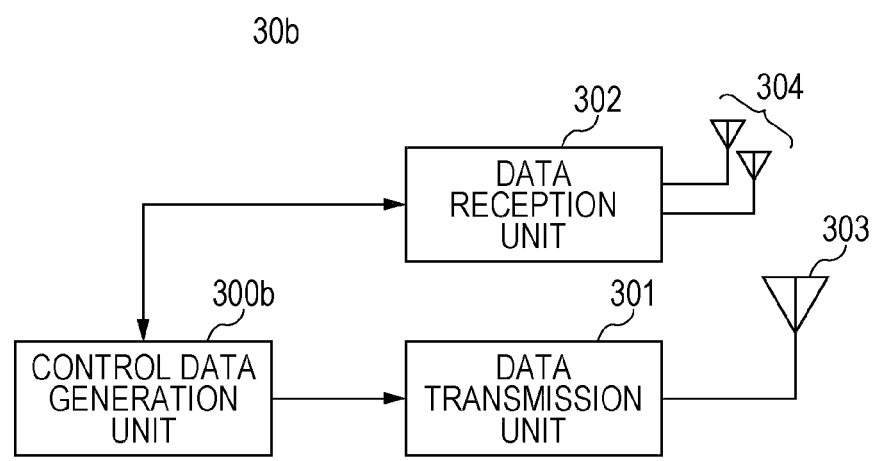
FIG. 11 is a schematic block diagram showing a configuration of the pico base station apparatus 30b according to the same embodiment.

FIG. 11 is a schematic block diagram showing a configuration of the pico base station apparatus 30b. The pico base station apparatus 30b is different from the macro base station apparatus 30a in terms of having a control data generation unit 300b instead of the control data generation unit 300a and having smaller maximum transmit power of the transmission unit 301 than that of the macro base station apparatus 30a. Other parts are the same so that description thereof will be omitted. The control data generation unit 300b generates control information CI to be notified to the terminal apparatus 20 by referring to a channel estimation value which is input from the data reception unit 302. The control data generation unit 300b inputs the generated control information CI to the data transmission unit 301 to transmit to the terminal apparatus 20.

In the same manner as the macro base station apparatus 30a, the control information CI includes power control information associated with transmit power control, resource block assignment information, MCS (Modulation and Coding Scheme) information for designating a coding rate and a modulation scheme, rank information for designating the number of streams, precoding information for designating a precoding matrix, and SRS information for designating arrangement of the sounding reference signal. However, as to the control data generation unit 300b, by taking a case where the maximum value of the number of clusters of the terminal apparatus 20 is "2" in the event of performing the scheduling for determining assignment of resource blocks in the uplink as an example, assignment information of the resource blocks in the uplink generated by the control data generation unit 300b is assignment information having the maximum value of the number of clusters of "2", which is exemplified in FIG. 6.

Moreover, the control data generation unit 300b has the interval storage unit for pico 237 shown in FIG. 3, and determines a combination which is used by each of the terminal apparatuses 20 connected with the own apparatus from combinations of the time interval and the frequency interval which are stored in the interval storage unit for pico 237. The control data generation unit 300b generates SRS information which includes an index of the determined combination.

Note that, the control data generation unit 300b inputs the resource block assignment information, the MCS information, the rank information and the precoding information of the generated control information CI to the data reception unit 302. Further, the control data generation unit 300b generates information showing arrangement of the sounding reference signal according to the SRS information of the generated control information CI to input to the data reception unit 302.

Further, in a case where the frequency selection diversity gain is not expected at all between the terminal apparatus 20 and the pico base station apparatus 30b, if notification of resource block assignment information which is used is not performed at all for each communication opportunity from the pico base station apparatus 30b to the terminal apparatus 20 (it is set that in the case where the terminal apparatus 20 communicates with the macro bases station apparatus 30a, notification of resource block assignment information which is used is performed for each communication opportunity from the macro base station apparatus 30a to the terminal apparatus 20), it is possible to further reduce the control information. In this case, there is a method for determining resource blocks which are used in advance for each of the terminal apparatuses 20 or determining resource blocks based on an value of an ID or the like which is specific to the terminal apparatus 20, etc. Further, by changing a resource which is used being depending on a frame number as well, it is possible to avoid a situation where the resource blocks with a frequency having bad channel performances are used at all times.

Moreover, it is not necessary to designate the resource blocks which are completely and absolutely used for each of the terminal apparatuses 20, and it is possible to perform communication more efficiently by partial superimposing.

Further, each of the base station apparatuses determines arrangement of the sounding reference signal in the present embodiment, but the arrangement of the sounding reference signal may be determined by the macro base station apparatus 20*a*, or may be determined independently by the terminal apparatus 20 based on a value of an ID or the like which is specific to the terminal apparatus 20. In addition, in the case where the terminal apparatus 20 performs communication with the base station by using two or more component carriers (one system band supporting LTE Rel.8), the arrangement of the sounding reference signal is able to be set for each component carrier.

On the other hand, as shown so far, it is possible to expect that communication which satisfies predetermined quality is performed between the pico base station apparatus 30*b* and the terminal apparatus 20 without expecting the frequency selection diversity gain. Thus, it becomes possible that a type of the parameter described above which is set in advance is changed from that of the macro base station apparatus 30*a* to increase at least one of the frequency interval and the time interval (which is the same in the case of using a minimum frequency interval which is a minimum frequency interval at which the terminal apparatus 20 transmits the sounding reference signal in the case where the frequency interval at which the terminal apparatus 20 transmits the sounding reference signal is not fixed and a minimum time interval which is a minimum time interval at which the terminal apparatus 20 transmits the sounding reference signal in the case where the time interval at which the terminal apparatus 20 transmits the sounding reference signal is not fixed). At this time, the arrangement of the sounding reference signal to be transmitted to the pico base station apparatus 30*b* may be determined by the macro base station apparatus 30*a* or the pico base station apparatus 30*b* or may be determined independently by the terminal apparatus 20 based on a value of an ID or the like which is specific to the terminal apparatus. In addition, in the case where the terminal apparatus 20 performs communication with the base station by using two or more component carriers, the arrangement of the sounding reference signal is able to be set for each component carrier.

In the case where the frequency interval or the time interval at which the sounding reference signal is arranged is able to be made wider, the overhead for transmission of the sounding reference signal decreases, thus making it possible to increase throughput in the uplink of the small cell.

Note that, it is also possible to perform setting such that the terminal apparatus 20 does not transmit any sounding reference signal periodically at all. Moreover, the terminal apparatus 20 is also able to transmit a signal for grasping situation of a channel, including the sounding reference signal, not periodically but by an instruction from the macro base station apparatus 30*a* or the pico base station apparatus 30*b*.

[Second embodiment]

Description will hereinafter be given for a second embodiment of the present invention with reference to drawings. A radio communication system 11 in the present embodiment is configured by including a macro base station apparatus 31*a*, a pico base station apparatus 31*b* and a terminal apparatus 21. In the first embodiment, assignment of radio frequency resources to the terminal apparatus 20 is performed with a resource block which is configured with a predetermined frequency width (one or more contiguous subcarriers) as a frequency assignment unit. If the total number of subcarriers used for communication is a certain number, as the number of subcarriers which constitute the frequency assignment unit increases, the total number of the frequency assignment units decreases and the bit number of information for designating the frequency assignment unit (corresponding to the RB number of the first embodiment) decreases. On the other hand, as the number of subcarriers which constitute the frequency assignment unit increases, a difference of frequency gains in the frequency assignment unit is reduced, so that a diversity gain which is expected by selecting the frequency assignment unit at the time of communication is reduced.

Thus, in the present embodiment, by setting the number of subcarriers which constitute the frequency assignment unit in communication of the macro base station apparatus 31*a* and the terminal apparatus 21 and the number of subcarriers which constitute the frequency assignment unit in communication of the pico base station apparatus 31*b* and the terminal apparatus 21 to different values, overhead for at least any one of them is reduced.

Figure 12:
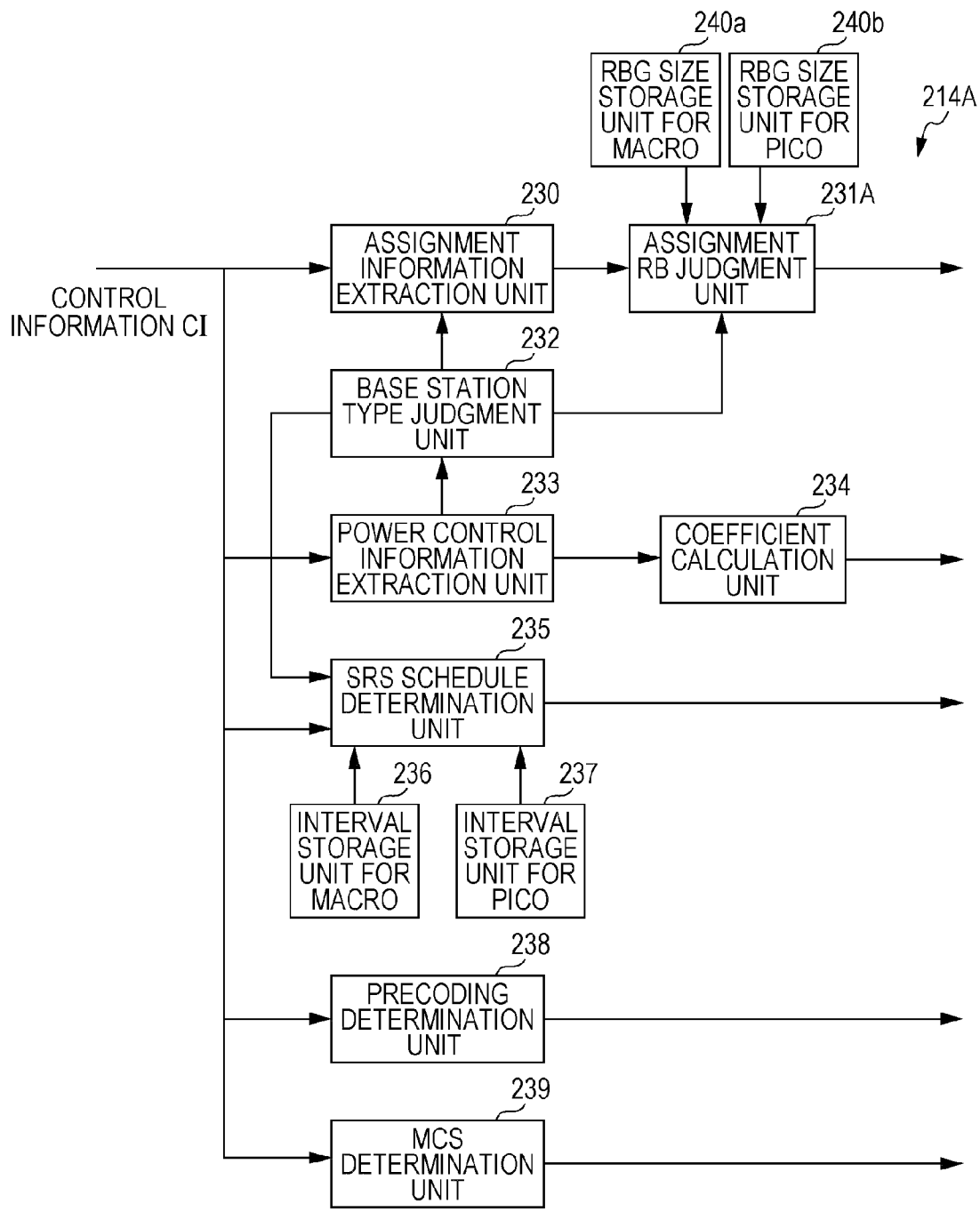
FIG. 12 is a schematic block diagram showing a configuration of a control unit 214A of a terminal apparatus 21 according to a second embodiment of the present invention.

FIG. 12 is a schematic block diagram showing a configuration of a control unit 214A of the terminal apparatus 21. The terminal apparatus 21 is different from the terminal apparatus 20 of FIG. 2 only in terms of having the control unit 214A instead of the control unit 214. As shown in FIG. 12, the control unit 214A is different from the control unit 214 of FIG. 3 in terms of having an assignment RB judgment unit 231A instead of the assignment. RB judgment unit 231 and having an RBG size storage unit for macro 240*a* and an RBG size storage unit for pico 240*b*.

The RBG size storage unit for macro 240*a* stores the number of resource blocks of a resource block group (RBG) in the case where the type of the destination base station is the macro base station and a system bandwidth in association with each other. Here, the resource block group is a minimum frequency assignment unit in the present embodiment, and is composed of resource blocks which are contiguous in a frequency direction. Assignment information in the present embodiment designates the resource block which is assigned with an RBG number and the number of RBGs instead of the RB number and the number of RBs in the first embodiment. The RBG number is a serial number of resource block groups, and the number of RBGs indicates the number of the resource block groups. Note that, in the present embodiment, the number of subcarriers constituting the resource block is common in the macro base station and the pico base station, and the number of resource blocks constituting the resource block group which is the minimum frequency assignment unit is changed according to the type of the destination base station, but in the case where the resource block is set as the minimum frequency assignment unit in the present embodiment, the number of subcarriers constituting the resource block may be changed according to the type of the destination base station.

The RBG size storage unit for pico 240*b* stores the number of resource blocks of a resource block group in the case where the type of the destination base station is the pico base station and the system bandwidth in association with each other. Note that, a range of the present invention is not departed also in the case where the RBG size storage unit for pico 240*b* does not store the number of resource blocks of a resource block group in the case where the type of the destination base station is the pico base station and the system bandwidth in association with each other (a case where the predetermined number of resource blocks of a resource block group is used regardless of the system bandwidth in the case where the type of the destination base station is the pico base station). The number of resource blocks stored in association with each system bandwidth by the RBG size storage unit for pico 240*b* is larger than the number of resource blocks stored in association with the same system bandwidth by the RBG size storage unit for macro 240*a*. Thereby, maximum values of the RBG number and the number of RBGs become smaller than the case where the type of the destination base station is the macro base station. That is, since the bit numbers of the RBG number and the number of RBGs decrease, the bit number of assignment information also decreases, thus making it possible to reduce overhead by the assignment information and achieve excellent transmission efficiency.

The assignment RB judgment unit 231A determines the number of resource blocks of a resource block group RBG by using the type of the destination base station and the system bandwidth. In the event of determining the number of resource blocks of the resource block group RBG, the assignment RB judgment unit 231A refers to the RBG size storage unit for macro 240*a* or the RBG size storage unit for pico 240*b* according to the type of the destination base station which is acquired from the base station type judgment unit 232. The assignment RB judgment unit 231A uses the determined number of resource blocks to judge resource blocks indicated by assignment information extracted by the assignment information extraction unit 230.

FIG. 13 is a view showing an example of a storage content of the RBG size storage unit for macro 240*a*. In the example shown in FIG. 13, the RBG size storage unit for macro 240*a* stores the system bandwidth "5 MHz" and the number of resource blocks of a resource block group "2" in association with each other. In the same manner, the system bandwidth "10 MHz" and the number of resource blocks "3" are stored in association with each other, the system bandwidth "15 MHz" and the number of resource blocks "4" are stored in association with each other, and the bandwidth "20 MHz" and the number of resource blocks "5" are stored in association with each other.

FIG. 14 is a view showing an example of a storage content of the RBG size storage unit for pico 240*b*. In the example shown in FIG. 14, the RBG size storage unit for macro 240*b* stores the system bandwidth "5 MHz" and the number of resource blocks of the resource block group "4" in association with each other. In the same manner, the system bandwidth "10 MHz" and the number of resource blocks "6" are stored in association with each other, the system bandwidth "15 MHz" and the number of resource blocks "8" are stored in association with each other, and the bandwidth "20 MHz" and the number of resource blocks "10" are stored in association with each other.

In the examples shown in FIG. 13 and FIG. 14 as well, the number of resource blocks, which is stored in association with each system bandwidth by the RBG size storage unit for pico 240*b*, is larger than the number of resource blocks, which is stored in association with the same system bandwidth by the RBG size storage unit for macro 240*a*. For example, the system bandwidth 10 MHz is stored in association with "6" by the RBG size storage unit for macro 240*a*, but is stored in association with "3" by the RBG size storage unit for pico 240*b*.

Note that, the macro base station apparatus 31*a* is different from the macro base station apparatus 30*a* of FIG. 10 in terms of having a control data generation unit 310*a* instead of the control data generation unit 300*a*. The control data generation unit 310*a* generates control information CI in the same manner as the control data generation unit 300*a*, but has the RBG size storage unit for macro 240*a* and is different from the control data generation unit 300*a* in terms of performing scheduling and generation of assignment information with a resource block group with the number of resource blocks that is determined by referring to this storage unit as the frequency assignment unit.

In the same manner, the pico base station apparatus 31*b* is different from the pico base station apparatus 30*b* of FIG. 11 in terms of having a control data generation unit 310*b* instead of the control data generation unit 300*b*. The control data generation unit 310*b* generates control information CI in the same manner as the control data generation unit 300*b*, but has the RBG size storage unit for pico 240*b* and is different from the control data generation unit 300*b* in terms of performing scheduling and generation of assignment information with a resource block group with the number of resource blocks that is determined by referring to this storage unit as the frequency assignment unit.

In the event of performing transmission to the pico base station apparatus 31*b*, there is a margin in transmit power of the terminal apparatus 21 in the same manner as the first embodiment, thus making it possible to achieve sufficient communication quality by increasing the transmit power. Accordingly, by making the frequency assignment unit in the pico base station apparatus 31*b* larger than that of the macro base station apparatus 31*a*, it is possible to suppress the bit number of assignment information in the case where the type of the destination base station is the pico base station without occurrence of deterioration of communication quality.

[Third embodiment]

Description will hereinafter be given for a third embodiment of the present invention with reference to drawings. A radio communication system 12 in the present embodiment is configured by including a macro base station apparatus 32*a*, a pico base station apparatus 32*b* and a terminal apparatus 22. In the event of transmitting data to the macro base station apparatus 32*a* or the pico base station apparatus 32*b*, the terminal apparatus 22 selects an access scheme and also selects a modulation scheme and a coding rate.

As the number of combinations of the modulation scheme and the coding rate increases, possibility of selecting the modulation scheme and the coding rate suitable for a channel becomes high, thus making it possible to improve throughput. However, in the case where the number of these combinations increases, a quantity of control information which is demanded to designate a selected combination increases.

Thus, in the present embodiment, a total number of these combinations in the small cell is made smaller than a total number of combination in the macro cell. Since there is a margin in transmit power of the terminal apparatus 22 particularly in the small cell, the modulation scheme and the coding rate with a low transmission rate may not be used. This is because in the case where performances (error rate performances) are deteriorated in communication, it is possible to deal with it by increasing the transmit power because of the margin in the transmit power in the same manner as the first embodiment.

Figure 15:
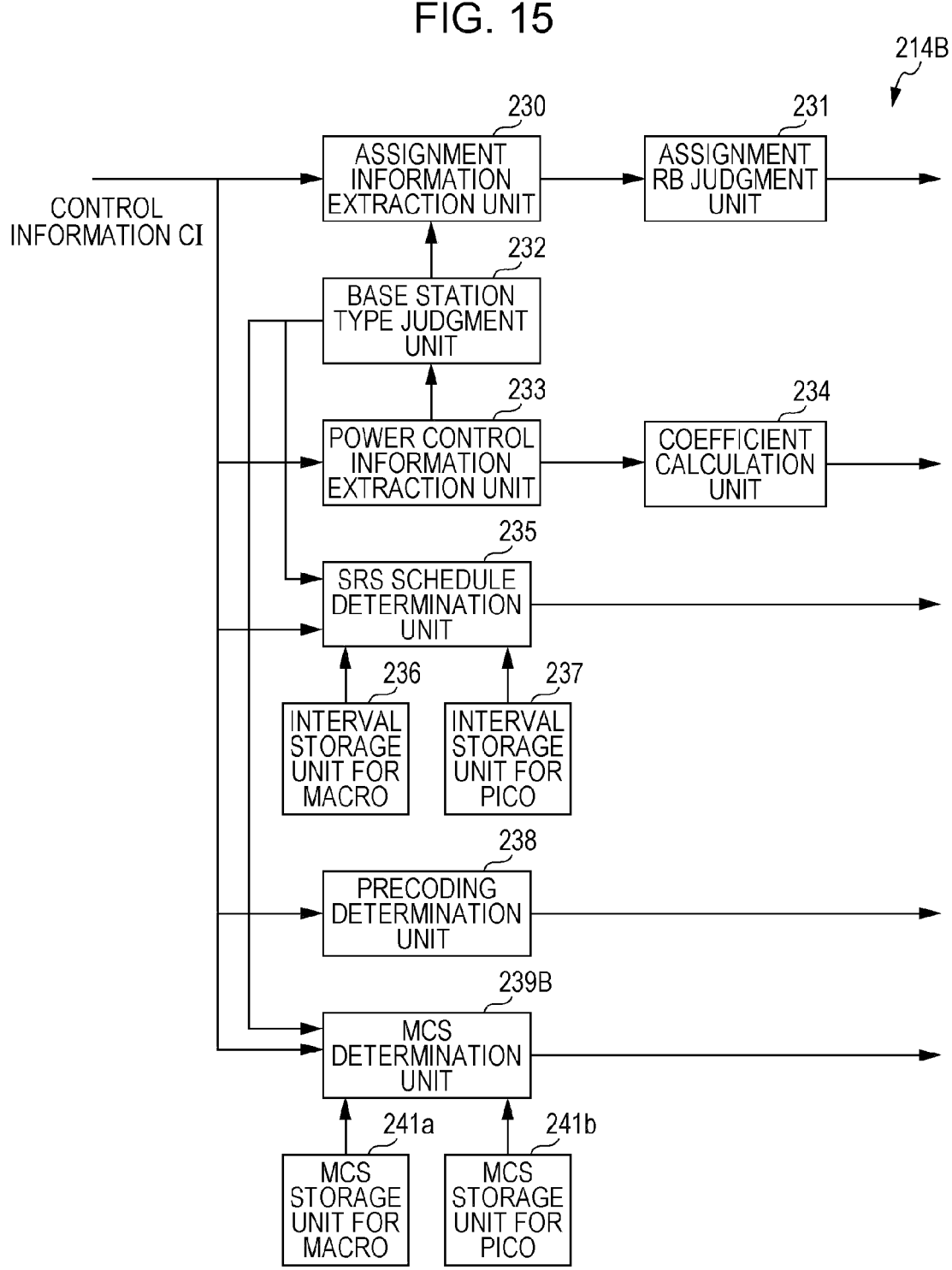
FIG. 15 is a schematic block diagram showing a configuration of a control unit 214B of a terminal apparatus 22 according to a third embodiment of the present invention.

FIG. 15 is a schematic block diagram showing a configuration of a control unit 214B of the terminal apparatus 22. The terminal apparatus 22 is different from the terminal apparatus 20 of FIG. 2 only in terms of having the control unit 214B instead of the control unit 214. As shown in FIG. 15, the control unit 214B is different from the control unit 214 of FIG. 3 in terms of having an MCS determination unit 239B instead of the MCS determination unit 239 and having an MCS storage unit for macro 241a and an MCS storage unit for pico 241b.

The MCS storage unit for macro 241a stores the combination of the modulation scheme and the coding rate in association with a value of MCS information. The MCS storage unit for pico 241b stores the combination of the modulation scheme and the coding rate in association with a value of MCS information. The combinations of the modulation scheme and the coding rate stored in the MCS storage unit for pico 241b are obtained by excluding a combination with a low transmission rate from the combinations stored in the MCS storage unit for macro 241a.

The MCS determination unit 239B determines the modulation scheme and the coding rate by extracting MCS information from the control information CI in the same manner as the MCS determination unit 239. However, it is different from the MCS determination unit 239 in terms of that in the case where the type of the destination base station is the macro base station, the MCS storage unit for macro 241a is referred to and the pico base station refers to the MCS storage unit for pico 241b. Specifically, in the case where the type of the destination base station is the macro base station, the MCS determination unit 239B reads a modulation scheme and a coding rate which are associated with a value of MCS information from the MCS storage unit for macro 241a and notifies the coding unit 201 of the modulation schema and the coding rate. In the same manner, in the case where the type of the destination base station is the pico base station, the MCS determination unit 239B reads a modulation scheme and a coding rate which are associated with a value of MCS information from the MCS storage unit for pico 241b and notifies the coding unit 201 of the modulation scheme and the coding rate.

FIG. 16 is a view showing an example of a storage content of the MCS storage unit for macro 241a. In the example of FIG. 16, the combination of the modulation scheme "BPSK" and the coding rate R "1/3" is stored in association with the value of MCS "000". In the same manner, the combination of the modulation scheme "BPSK" and the coding rate R "1/2" is stored in association with the value of MCS "001", the combination of the modulation scheme "QPSK" and the coding rate R "1/3" is stored in association with the value of MCS "010", and the combination of the modulation scheme "QPSK" and the coding rate R "1/2" is stored in association with the value of MCS "011".

Further, the combination of the modulation scheme "16QAM" and the coding rate R "1/3" is stored in association with the value of MCS "100", the combination of the modulation scheme "16QAM" and the coding rate R "1/2" is stored in association with the value of MCS "101", the combination of the modulation scheme "64QAM" and the coding rate R "1/3" is stored in association with the value of MCS "110", and the combination of the modulation scheme "64QAM" and the coding rate R "1/2" is stored in association with the value of MCS "111".

FIG. 17 is a view showing an example of a storage content of the MCS storage unit for pico 241b. In the example of FIG. 17, the values of MCS from "100" to "111" are the same as in the example of the storage content of the MCS storage unit for macro 241a of FIG. 16, but not used ("Not Used") is given for the values of MCS from "000" to "011" with a low transmission rate.

Note that, the macro base station apparatus 32a is different from the macro base station apparatus 30a of FIG. 10 in terms of having a control data generation unit 320a instead of the control data generation unit 300a. The control data generation unit 320a generates the control information CI in the same manner as the control data generation unit 300a, but is different from the control data generation unit 300a in terms of having the MCS storage unit for macro 241a and performing generation of MCS information which is determined by referring to this storage unit.

In the same manner, the pico base station apparatus 32b is different from the pico base station apparatus 30b of FIG. 11 in terms of having a control data generation unit 320b instead of the control data generation unit 300b. The control data generation unit 320b generates the control information CI in the same manner as the control data generation unit 300b, but is different from the control data generation unit 300b in terms of having the MCS storage unit for pico 241b and performing generation of MCS information which is determined by referring to this storage unit.

Thereby, since 8 ($=2^3$) types of modulation schemes and coding rates are designated in the macro cell, MCS information for designating the modulation schemes and the coding rates needs 3 bits, but 4 ($=2^2$) types of the modulation schemes and the coding rates are designated in the small cell, and therefore it is possible to set MCS information for designating the modulation schemes and the coding rates as 2 bits, thus making it possible to reduce MCS information by 1 bit (first 1 bit becomes unnecessary in a table). This makes it possible to suppress overhead by MCS information and achieve excellent transmission efficiency.

Moreover, the storage content of the MCS storage unit for pico 241b may be like an example shown in FIG. 18. In the example of FIG. 18, the values of MCS from "010" to "111" are the same as in the example of the storage content of the MCS storage unit for macro 241a of FIG. 16. However, in the MCS storage unit for macro 241a, the modulation scheme "256QAM" and the coding rate R "1/3", and the modulation scheme "256QAM" and the coding rate R "1/2" are associated with the values of MCS of "000" and "001" with a low transmission rate. That is, the combination having a higher transmission rate than all the combinations stored in the MCS storage unit for macro 241a is associated. This makes it possible to use a combination of a modulation scheme and a coding rate having a high transmission rate for the small cell without increasing the bit number of MCS information and to achieve excellent transmission efficiency.

[Fourth embodiment]

Description will hereinafter be given for a fourth embodiment of the present invention with reference to drawings. A radio communication system 13 in the present embodiment is configured by including a macro base station apparatus 33a, a pico base station apparatus 33b and a terminal apparatus 23. In the event of transmitting data to the base station apparatus by using a plurality of transmit antennas, the terminal apparatus 23 selects the number of streams (rank) and a precoding pattern (precoding matrix).

As the number of combinations of the number of streams and the precoding pattern increases, the number of streams and the precoding pattern more suitable for a channel are able to be selected, thus making it possible to improve throughput. However, in the case where the number of these combinations increases, a quantity of control information which is demanded to designate a selected combination increases.

Thus, in the present embodiment, a total number of these combinations in the small cell is made smaller than a total number of the combinations in the macro cell.

Since the small cell which is a service area of the pico base station apparatus 33b has a narrow cell range, distance attenuation between the pico base station apparatus 33b and the terminal apparatus 23 is suppressed. Therefore, in the same manner as the first embodiment, there is a margin in transmit power of the terminal apparatus 23, and deterioration of communication quality due to increase in the number of streams is able to be compensated for by increasing the transmit power. Thus, in the event of performing communication with the pico base station apparatus 33b, the number of streams used for transmission by the terminal apparatus 23 is set to a predetermined value or more.

In the case where the number of streams used by the terminal apparatus 23 for transmission to the pico base station is limited, the total number of the combinations of the number of streams and the precoding pattern decreases, thus making it possible to reduce the bit number in the event of designating the number of streams and the precoding pattern to the terminal apparatus.

Figure 19:
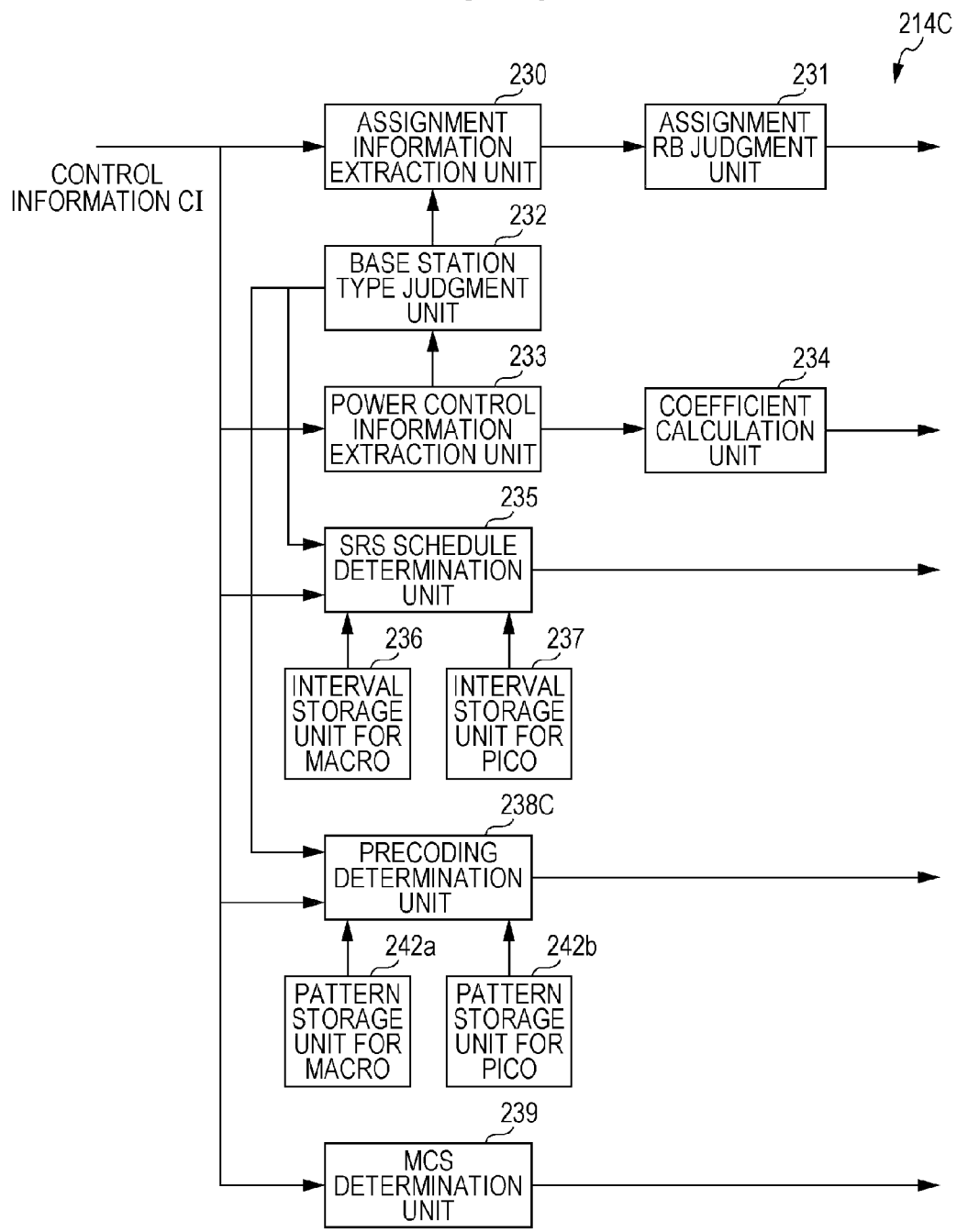
FIG. 19 is a schematic block diagram showing a configuration of a control unit 214C of a terminal apparatus 23 according to the third embodiment of the present invention.

FIG. 19 is a schematic block diagram showing a configuration of a control unit 214C of the terminal apparatus 23. The terminal apparatus 23 is different from the terminal apparatus 20 of FIG. 2 only in terms of having the control unit 214C instead of the control unit 214. As shown in FIG. 19, the control unit 214C is different from the control unit 214 of FIG. 3 in terms of having a precoding determination unit 238C instead of the precoding determination unit 238 and having a pattern storage unit for macro 242a and a pattern storage unit for pico 242b.

The pattern storage unit for macro 242a stores the combination of the number of streams and the precoding pattern in the case where the type of the destination base station is the macro base station in association with an index. The pattern storage unit for pico 242b stores the combination of the number of streams and the precoding pattern in the case where the type of the destination base station is the pico base station in association with the index. In the example of the present embodiment, the number of streams in the combination stored in the pattern storage unit for pico 242b is limited to only "2".

Thereby, since the total number of the combinations of the number of streams and the precoding pattern in the small cell is smaller than the total number in the macro cell, the bit number of the indexes indicating the combinations in the small cell decreases so that it is possible to reduce overhead by control information for designating the number of streams and the precoding pattern and to achieve excellent transmission efficiency.

The precoding determination unit 238C extracts the index from the control information CI in the same manner as the precoding determination unit 238 and determines the number of streams and the precoding matrix. However, it is different from the precoding determination unit 238 in terms of that the pattern storage unit for macro 242a is referred to in the case where the type of the destination base station is the macro base station and the pico base station refers to the pattern storage unit for pico 242b.

FIG. 20 is a view showing an example of a storage content of the pattern storage unit for macro 242a. In the example of FIG. 20, the number of streams "1" and the precoding pattern "pattern 0" are stored in association with the index "0". In the same manner, the number of streams "1" and the precoding pattern "pattern 1" are stored in association with the index "1", . . . , the number of streams "1" and the precoding pattern "pattern 23" are stored in association with the index "23", the number of streams "2" and the precoding pattern "pattern 0" are stored in association with the index "24", . . . , the number of streams "2" and the precoding pattern "pattern 15" are stored in association with the index "39".

FIG. 21 is a view showing an example of a storage content of the pattern storage unit for pico 242b. In the example of FIG. 21, the indexes from "24" to "39" are the same as in the example of the storage content of the pattern storage unit for macro 242a of FIG. 20, but not used ("Not Used") is given for the indexes from "0" to "23" in which the number of streams is "1" in the pattern storage unit for macro 242a.

Note that, the macro base station apparatus 33a is different from the macro base station apparatus 30a of FIG. 10 in terms of having a control data generation unit 330a instead of the control data generation unit 300a. The control data generation unit 330a generates the control information CI in the same manner as the control data generation unit 300a, but is different from the control data generation unit 300a in terms of having the pattern storage unit for macro 242a and performing generation of the control information CI including the index according to the combination of the number of streams and the precoding patter determined by referring to this storage unit.

In the same manner, the pico base station apparatus 33b is different from the pico base station apparatus 30b of FIG. 11 in terms of having a control data generation unit 330b instead of the control data generation unit 300b. The control data generation unit 330b generates the control information CI in the same manner as the control data generation unit 300b, but is different from the control data generation unit 300b in terms of having the pattern storage unit for pico 242b and performing generation of the control information CI including the index according to the combination of the number of streams and the precoding patter determined by referring to this storage unit.

Thereby, since 40 types of the numbers of streams and the precoding patterns are designated in the macro cell, the indexes for designating the numbers of streams and the precoding patterns need 6 bits. In the small cell, since 16 ($=2^4$) types of the numbers of streams and the precoding patterns are designated, the indexes for designating the numbers of streams and the precoding patterns are able to be set to 4 bits, thus making it possible to reduce information for designating the numbers of streams and the precoding patterns by 2 bits. This makes it possible to suppress overhead by the indexes for designating the numbers of streams and the precoding patterns and achieve excellent transmission efficiency.

Moreover, each apparatus may be realized by recording a program for realizing functions or a part of functions of each of the terminal apparatuses 20, 21, 22 and 23, the macro base station apparatuses 30a, 31a, 32a and 33a, and the pico base station apparatuses 30b, 31b, 32b and 33b in each of the embodiments in a computer readable recording medium and causing a computer system to read this program recorded in the recording medium for execution. Note that, the "computer system" which is referred to here includes an OS and hardware such as peripheral equipment.

Further, the "computer readable recording medium" refers to a portable medium such as a flexible disk, a magneto-optical disk, a ROM or a CD-ROM, or a storage apparatus such as a hard disk installed in the computer system. Furthermore, the "computer readable recording medium" also includes one for holding a program dynamically for a short time period like a communication line in a case where a program is transmitted via a network such as the Internet or a communication line such as a telephone line, and one for holding a program for a fixed period of time like a volatile memory inside a computer system serving as a server or a client in such a case. In addition, the aforementioned program may be one for realizing a part of the functions described above, and further may be one capable of realizing the functions described above in combination with a program which has been already recorded in the computer system.

Moreover, a part of or all of each of the terminal apparatuses 20, 21, 22 and 23, the macro base station apparatuses 30a, 31a, 32a and 33a, and the pico base station apparatuses 30b, 31b, 32b and 33b in each of the aforementioned embodiments may be realized typically as an LSI which is an integrated circuit. Each functional block of the terminal apparatuses 20, 21, 22 and 23, the macro base station apparatuses 30a, 31a, 32a and 33a, and the pico base station apparatuses 30b, 31b, 32b and 33b may be chipped individually, or a part or all thereof may be chipped being integrated. Further, a method for making into an integrated circuit is not limited to the LSI and a dedicated circuit or a versatile processor may be used for realization. Any of hybrid one and monolithic one may be used. The functions may be realized partially by hardware and partially by software.

Further, in a case where a technology for making into an integrated circuit, etc. in place of the LSI appears with advance of a semiconductor technology, an integrated circuit by this technology may be also used.

Note that, an aspect of the present invention is a terminal apparatus which performs communication with a first base station apparatus and a second base station apparatus which has smaller maximum transmit power than that of the first base station apparatus, including a control unit that extracts control information from signals received from the first base station apparatus and the second base station apparatus and sets communication parameters of an uplink data signal, in which a bit number which is extracted by the control unit as the control information from the signal from the second base station apparatus is smaller than a bit number which is extracted as the control information from the signal from the first base station apparatus.

Thereby, it is possible to suppress radio resources occupied by the control information which is transmitted by the second base station apparatus to use for transmission of data, thus making it possible to achieve excellent transmission efficiency.

Moreover, an aspect of the present invention is the aforementioned terminal apparatus, in which the control information may include at least frequency assignment information of uplink data transmission, and an upper limit of a number of clusters that are able to be arranged by using the frequency assignment information by the control unit may be smaller in a case where the control information from the second base station apparatus is used than a case where the control information from the first base station is used.

Moreover, an aspect of the present invention is the aforementioned terminal apparatus, in which the control information may include at least frequency assignment information of uplink data transmission, and a minimum frequency assignment unit at the time of arrangement by using the frequency assignment information by the control unit may be larger in a case where the control information from the second base station apparatus is used than a case where the control information from the first base station is used.

Moreover, an aspect of the present invention is a terminal apparatus that performs communication of data with a first base station apparatus and a second base station apparatus which has smaller maximum transmit power than that of the first base station apparatus, in which a first range which is a range of communication parameters usable in the case of performing communication of data with the first base station apparatus and a second range which is a range of communication parameters usable in the case of performing communication of data with the second base station apparatus are different.

This makes it possible that the usable communication parameters have an appropriate range in each of the first base station apparatus and the second base station apparatus, thus making it possible to achieve excellent transmission efficiency.

Moreover, an aspect of the present invention is the aforementioned terminal apparatus, in which a total number of the communication parameters included in the first range may be smaller than a total number of the communication parameters included in the second range.

Thereby, an information quantity of the control information for sharing the communication parameters between the second base station apparatus and the terminal apparatus is reduced, thus making it possible to achieve excellent transmission efficiency. At this time, the second base station apparatus has smaller maximum transmit power than that of the first base station apparatus, and therefore has a narrower communication range than that of the first base station apparatus. Accordingly, since same situation as a cell end of the first base station apparatus does not occur in the terminal apparatus which communicates with the second base station apparatus, it is possible to maintain sufficient transmission quality even if a value of the communication parameter used in this situation falls out of the second range.

Moreover, an aspect of the present invention is any of the aforementioned terminal apparatuses, in which a frequency signal may be set to one or a plurality of clusters, each of the clusters may be transmitted being arranged in a predetermined frequency, and the communication parameter may be the number of clusters.

Thereby, for example, the number of clusters in a case where communication is performed between the second base station apparatus and the terminal apparatus is made smaller than a case where communication is performed between the first base station apparatus and the terminal apparatus, and the information quantity of the control information for sharing a frequency at which each of the clusters is arranged is reduced, thus making it possible to achieve excellent transmission efficiency.

Moreover, an aspect of the present invention is any of the aforementioned terminal apparatuses, in which a communication parameter having the worst transmission efficiency of the communication parameters included in the first range may not be included in the second range.

Thereby, the information quantity of the control information for sharing the communication parameters between the second base station apparatus and the terminal apparatus is reduced, thus making it possible to achieve excellent transmission efficiency. At this time, the second base station apparatus has smaller maximum transmit power than that of the first base station apparatus, and therefore has a narrower communication range than that of the first base station apparatus. Accordingly, in the case of performing communication with the second base station apparatus, even if the parameter having the worst transmission efficiency of the first range is not used, it is possible to maintain sufficient transmission quality.

Moreover, an aspect of the present invention is any of the aforementioned terminal apparatuses, in which a communication parameter having the most excellent transmission efficiency of the communication parameters included in the second range may not be included in the first range.

Thereby, it is possible to achieve excellent transmission efficiency between the second bases station apparatus and the terminal apparatus. At this time, the second base station apparatus has smaller maximum transmit power than that of the first base station apparatus, and therefore has a narrower communication range than that of the first base station apparatus. Accordingly, in the case of performing communication with the second base station apparatus, even if the communication parameter having more excellent transmission efficiency than that of the case of performing communication with the first base station apparatus is used, it is possible to maintain sufficient transmission quality.

Moreover, an aspect of the present invention is any of the aforementioned terminal apparatuses, in which the communication parameters may be a combination of a number of streams and a precoding pattern.

Moreover, an aspect of the present invention is any of the aforementioned terminal apparatuses, in which the communication parameters may be a combination of a modulation scheme and a coding rate.

Moreover, an aspect of the present invention is a processor in a terminal apparatus that performs communication of data with a first base station apparatus and a second base station apparatus which has smaller maximum transmit power than that of the first base station apparatus, in which a first range which is a range of communication parameters usable in the case of performing communication of data with the first base station apparatus and a second range which is a range of communication parameters usable in the case of performing communication of data with the second base station apparatus are different.

Moreover, an aspect of the present invention is a communication method in a terminal apparatus that performs communication of data with a first base station apparatus and a second base station apparatus which has smaller maximum transmit power than that of the first base station apparatus, including: a first process that the terminal apparatus performs communication of data with the first base station apparatus; and a second process that the terminal apparatus performs communication of data with the second base station apparatus, in which a first range which is a range of communication parameters usable at the first process and a second range which is a range of communication parameters usable at the second process are different.

Moreover, an aspect of the present invention is a terminal apparatus that performs communication of data with a first base station apparatus and a second base station apparatus which has smaller maximum transmit power than that of the first base station apparatus, in which an arrangement interval of a sounding reference signal which is used with the second base station apparatus is larger than an arrangement interval of a sounding reference signal which is used with the first base station apparatus.

Thereby, it is possible to reduce overhead by the sounding reference signal in the communication between the second base station apparatus and the terminal apparatus to achieve excellent transmission efficiency. At this time, the second base station apparatus has smaller maximum transmit power than that of the first base station apparatus, and therefore has a narrower communication range than that of the first base station apparatus. Accordingly, since the arrangement interval of the sounding reference signal is wide in the case of performing communication with the second base station apparatus, it is possible to maintain sufficient transmission quality even if accuracy of a channel state which is measured by using the sounding reference signal is deteriorated.

Moreover, an aspect of the present invention is a processor in a terminal apparatus that performs communication of data with a first base station apparatus and a second base station apparatus which has smaller maximum transmit power than that of the first base station apparatus, in which a minimum value of an arrangement interval that is able to be set of the sounding reference signal which is used with the second base station apparatus is larger than a minimum value of an arrangement interval that is able to be set of the sounding reference signal which is used with the first base station apparatus.

Moreover, an aspect of the present invention is a communication method in a terminal apparatus that performs communication of data with a first base station apparatus and a second base station apparatus which has smaller maximum transmit power than that of the first base station apparatus, including: a first process of transmitting and receiving a sounding reference signal between the terminal apparatus and the first base station apparatus; and a second process of transmitting and receiving a sounding reference signal between the terminal apparatus and the second base station apparatus, in which an arrangement interval of the sounding reference signal which is used at the second process is larger than an arrangement interval of the sounding reference signal which is used at the first process.

Moreover, an aspect of the present invention is a terminal apparatus that performs communication of data with a first base station apparatus and a second base station apparatus which has smaller maximum transmit power than that of the first base station apparatus, in which a frequency width of a minimum frequency assignment unit in the case of performing communication of data with the second base station apparatus is larger than a frequency width of a minimum frequency assignment unit in the case of performing communication of data with the first base station apparatus.

Thereby, an information quantity of the control information for sharing frequency assignment between the second base station apparatus and the terminal apparatus is reduced, thus making it possible to achieve excellent transmission efficiency. At this time, the second base station apparatus has smaller maximum transmit power than that of the first base station apparatus, and therefore has a narrower communication range than that of the first base station apparatus. Accordingly, since the frequency width of the minimum frequency assignment unit is large in the case of performing communication with the second base station apparatus, even if flexibility of frequency assignment decreases and a channel state of a frequency which is able to be assigned is deteriorated, it is possible to maintain sufficient transmission quality.

Moreover, an aspect of the present invention is a processor in a terminal apparatus that performs communication of data with a first base station apparatus and a second base station apparatus which has smaller maximum transmit power than that of the first base station apparatus, in which a frequency width of a minimum frequency assignment unit in the case of performing communication of data with the second base station apparatus is larger than a frequency width of a minimum frequency assignment unit in the case of performing communication of data with the first base station apparatus Moreover, an aspect of the present invention is a communication method in a terminal apparatus that performs communication of data with a first base station apparatus and a second base station apparatus which has smaller maximum transmit power than that of the first base station apparatus, including: a first process that the terminal apparatus performs communication of data with the first base station apparatus; and a second process that the terminal apparatus performs communication of data with the second base station apparatus, in which a frequency width of a minimum frequency assignment unit at the second process is larger than a frequency width of a minimum frequency assignment unit at the first process.

Moreover, an aspect of the present invention is a terminal apparatus that performs communication of data with a first base station apparatus and a second base station apparatus which has smaller maximum transmit power than that of the first base station apparatus, in which in the case of performing communication of data with the first base station apparatus, the communication of the data is performed by using a frequency resource which is designated to the first base station apparatus for each communication opportunity, and in the case of performing communication of data with the second base station apparatus, the communication of the data is performed by using a predefined frequency resource.

Thereby, the control information for sharing frequency assignment between the second base station apparatus and the terminal apparatus is eliminated, thus making it possible to achieve excellent transmission efficiency. At this time, the second base station apparatus has smaller maximum transmit power than that of the first base station apparatus, and therefore has a narrower communication range than that of the first base station apparatus. Accordingly, in the case of performing communication with the second base station apparatus, even if a channel state of a frequency to be used is deteriorated, it is possible to maintain sufficient transmission quality.

Moreover, an aspect of the present invention is a processor in a terminal apparatus that performs communication of data with a first base station apparatus and a second base station apparatus which has smaller maximum transmit power than that of the first base station apparatus, in which in the case of performing communication of data with the first base station apparatus, the communication of the data is performed by using a frequency resource which is designated to the first base station apparatus for each communication opportunity, and in the case of performing communication of data with the second base station apparatus, the communication of the data is performed by using a predefined frequency resource.

Moreover, an aspect of the present invention is a communication method in a terminal apparatus that performs communication of data with a first base station apparatus and a second base station apparatus which has smaller maximum transmit power than that of the first base station apparatus, including: a first process that the terminal apparatus performs communication of data with the first base station apparatus; and a second process that the terminal apparatus performs communication of data with the second base station apparatus, in which the communication of the data is performed by using a frequency resource which is designated to the first base station apparatus for each communication opportunity at the first process, and the communication of the data is performed by using a predefined frequency resource at the second process.

Moreover, an aspect of the present invention is a terminal apparatus that performs communication of data with a first base station apparatus and a second base station apparatus which has smaller maximum transmit power than that of the first base station apparatus, in which communication of a sounding reference signal is performed periodically with the first base station apparatus, and communication of a sounding reference signal is performed with the second base station apparatus in response to a request.

Thereby, it is possible to reduce overhead by the sounding reference signal in the communication between the second base station apparatus and the terminal apparatus to achieve excellent transmission efficiency. At this time, the second base station apparatus has smaller maximum transmit power than that of the first base station apparatus, and therefore has a narrower communication range than that of the first base station apparatus. Accordingly, since a channel state is able to be measured by the sounding reference signal only upon the request in the case of performing communication with the second base station apparatus, it is possible to maintain sufficient transmission quality even if accuracy of the measured channel state is deteriorated.

Moreover, an aspect of the present invention is a processor in a terminal apparatus that performs communication of data with a first base station apparatus and a second base station apparatus which has smaller maximum transmit power than that of the first base station apparatus, in which communication of a sounding reference signal is performed periodically with the first base station apparatus, and communication of a sounding reference signal is performed with the second base station apparatus in response to a request.

Moreover, an aspect of the present invention is a communication method in a terminal apparatus that performs communication of data with a first base station apparatus and a second base station apparatus which has smaller maximum transmit power than that of the first base station apparatus, including a first process of performing communication of a sounding reference signal periodically with the first base station apparatus, and a second process of performing communication of a sounding reference signal with the second base station apparatus in response to a request.

Moreover, an aspect of the present invention is any of the aforementioned terminal apparatuses, in which a power control unit that controls transmit power in the case of transmitting a signal is included, and the control unit may be configured so as to set transmit power in the case of transmitting the signal to the second base station apparatus to be higher than transmit power in the case of transmitting the signal to the first base station apparatus having same channel loss with respect to the power control unit.

Thereby, the terminal apparatus is able to use communication parameters having more excellent transmission efficiency in the case of transmitting to the second base station apparatus than the case of transmitting to the first base station apparatus, thus making it possible to achieve excellent transmission efficiency.

As above, the embodiments of this invention have been described in detail with reference to drawings, but specific configurations are not limited to these embodiments, and design change and the like which are not departed from the gist of this invention are also included.

INDUSTRIAL APPLICABILITY

The present invention is applicable to a mobile telephone, a personal computer, a tablet-type computer and the like.

REFERENCE SIGNS LIST

10, 11, 12, 13 radio communication system
20, 21, 22, 23 terminal apparatus
30*a*, 31*a*, 32*a*, 33*a* macro base station apparatus
30*b*, 31*b*, 32*b*, 33*b* pico base station apparatus
201-1, 201-2 coding unit 202-1, 202-2 S/P conversion unit
203-1, 230-2 DFT unit
204-1, 204-2 power control unit
205-1, 205-2 RB assignment unit
206 precoding unit
207-1, 207-2 SRS multiplex unit
208-1, 208-2 IDFT unit
209-1, 209-2 CP insertion unit
210-1, 210-2 P/S conversion unit
211-1, 211-2 D/A conversion unit
212-1, 212-2 RF unit
213-1, 213-2 transmit antenna
214, 214A, 214B, 214C control unit
215 SRS generation unit
220 receive antenna
221 reception unit
230 assignment information extraction unit
231, 231A assignment RB judgment unit
232 base station type judgment unit
233 power control information extraction unit
234 coefficient calculation unit
235 SRS schedule determination unit
236 interval storage unit for macro
237 interval storage unit for pico
238, 238C precoding determination unit
239, 239B MCS determination unit
240a RBG size storage unit for macro
240b RBG size storage unit for pico
241a MCS storage unit for macro
241b MCS storage unit for pico
242a pattern storage unit for macro
242b pattern storage unit for pico

The invention claimed is:

1. A terminal apparatus capable of transmitting a signal to a first communication and a second communication apparatus, the terminal apparatus comprising:
a reception circuit configured and/or programmed to:
receive, from the first communication apparatus, either a first control signal formed by a first signal format and including information used to communicate with the first communication apparatus, or a second control signal formed by a second signal format and including information used to communicate with the second communication apparatus, wherein
the first signal format and the second signal format have formats different from each other, and each of the first signal format and the second signal format includes frequency band assignment information necessary for the terminal apparatus to transmit data, and
a maximum number of contiguous frequency band clusters in the frequency band assignment information capable of being designated by the second signal format has a smaller value than the maximum number of contiguous frequency band clusters in frequency band assignment information capable of being designated by the first signal format; and
a control circuit configured and/or programmed to:
translate a value "00", in information related to transmit power control received in the first signal format as −1,
translate a value "01", in information related to transmit power control received in the first signal format, as 0,
translate a value "10", in information related to transmit power control received in the first signal format, as 1,
translate a value "11", in information related to transmit power control received in the first signal format, as 3, wherein
translation of values in information related to transmit power control received in the second signal format is different from the translation of values in information related to transmit power control received in the first signal format,
in a case that the first control signal is received, transmit, to the first communication apparatus, a signal using the frequency assignment indicated by the first signal format; and
in a case that the second control signal is received, transmit, to the second communication apparatus, an OFDM signal or a DFT-S-OFDM signal using the frequency assignment indicated by the second signal format, wherein
the first communication apparatus is a macro base station and the second communication apparatus is different from the macro base station.

2. The terminal apparatus according to claim 1, wherein the number of the clusters capable of being designated by the second signal format is 1.

3. The terminal apparatus according to claim 1, wherein a number of subcarriers included in a minimum unit used to designate the frequency assignment by the first signal format is different from a number of subcarriers included in a minimum unit used to designate the frequency assignment by the second signal format.

4. The terminal apparatus according to claim 1, wherein the first signal format and the second signal format each includes information on a Modulation and Coding Scheme (MCS), and the first signal format is different from the second signal format in terms of a total number of combinations of modulation scheme and coding rate specified by the MCS.

* * * * *